US006995705B2

(12) United States Patent
Bradford et al.

(10) Patent No.: US 6,995,705 B2
(45) Date of Patent: Feb. 7, 2006

(54) SYSTEM AND METHOD FOR DOPPLER TRACK CORRELATION FOR DEBRIS TRACKING

(75) Inventors: Bert L. Bradford, Damascus, MD (US); Richard A. Lodwig, deceased, late of Gaithersburg, MD (US); by Sandra Lodwig, legal representative, Frederick, MD (US); by Richard Lodwig, legal representative, Leesburg, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/359,555

(22) Filed: Feb. 7, 2003
(Under 37 CFR 1.47)

(65) Prior Publication Data

US 2004/0075605 A1 Apr. 22, 2004

Related U.S. Application Data

(60) Provisional application No. 60/354,481, filed on Feb. 8, 2002.

(51) Int. Cl.
*G01S 13/66* (2006.01)
*G01S 13/00* (2006.01)

(52) U.S. Cl. ............................ 342/95; 342/59; 342/89; 342/94; 342/98; 342/99; 342/175; 342/195; 342/450; 342/451; 342/463; 342/464; 342/465

(58) Field of Classification Search ........ 342/450–465, 342/27, 28, 59, 73–103, 165–175, 192–197
See application file for complete search history.

(56) References Cited

U.S. PATENT DOCUMENTS

| | | | | |
|---|---|---|---|---|
| 3,242,487 A | 3/1966 | Hammack | | |
| 3,270,340 A | 8/1966 | Hammack | | |
| 3,286,263 A | 11/1966 | Hammack | | |
| 3,706,096 A | 12/1972 | Hammack | | |
| 3,795,911 A | 3/1974 | Hammack | | |
| 4,697,186 A | 9/1987 | Rock | | |
| 4,994,809 A | 2/1991 | Yung et al. | ................. | 342/108 |
| 5,192,955 A | 3/1993 | Hoang | ......................... | 342/80 |
| 5,252,980 A | 10/1993 | Gray et al. | ................... | 342/59 |
| 5,381,156 A | 1/1995 | Bock et al. | ................. | 342/126 |
| 5,451,960 A | 9/1995 | Kastella et al. | ............... | 342/59 |
| 5,525,995 A | 6/1996 | Benner | | |
| 5,955,989 A | 9/1999 | Li | | |

(Continued)

FOREIGN PATENT DOCUMENTS

EP 1 168 003 A1 1/2002

(Continued)

OTHER PUBLICATIONS

International Search Report dated Jun. 26, 2003, for Application No. PCT/US03/03580.

(Continued)

*Primary Examiner*—Bernarr E. Gregory
(74) *Attorney, Agent, or Firm*—Marsh Fischmann & Breyfogle LLP

(57) ABSTRACT

The present invention is directed to a system and method for Doppler track correlation for debris tracking in PCL radar applications. The disclosed embodiments describe the systems and methods used in the detection of debris pieces and the association of the Doppler signals from the debris pieces across multiple illumination channels. The present invention also provides computation of debris state vectors and the projection of trajectories to determine debris impact points.

23 Claims, 18 Drawing Sheets

U.S. PATENT DOCUMENTS

| | | | | |
|---|---|---|---|---|
| 6,522,295 | B2 * | 2/2003 | Baugh et al. | 342/453 |
| 6,703,968 | B2 * | 3/2004 | Baugh | 342/453 |
| 6,710,743 | B2 * | 3/2004 | Benner et al. | 342/453 |
| 6,738,021 | B2 * | 5/2004 | Benner et al. | 342/451 |
| 6,798,381 | B2 * | 9/2004 | Benner et al. | 342/451 |
| 6,801,163 | B2 * | 10/2004 | Baugh et al. | 342/451 |
| 2002/0005803 | A1 | 1/2002 | Baugh et al. | |

FOREIGN PATENT DOCUMENTS

| | | | |
|---|---|---|---|
| WO | 02/35252 | A2 | 5/2002 |
| WO | 02/091009 | A2 | 11/2002 |
| WO | 02/091017 | A2 | 11/2002 |
| WO | 02/091018 | A1 | 11/2002 |

OTHER PUBLICATIONS

P. F. Howland, "Target Tracking Using Television-Based Bistatic Radar," IEE Proceedings, Radar, Sonar & Navigation, vol. 146, No. 3, Jun. 1999.

International Search Report dated Sep. 1, 2003, for Application No. PCT/US03/03580.

Kahny, D. et al., "First Results in Bistatic Calibration Techniques", Geoscience and Remote Sensing Symposium, Jun. 3, 1991, pp. 1401-1404.

Currie, N. C. et al., "Unique calibration issues for bistatic radar reflectivity measurements", Proceedings of the 1996 IEEE National, May 13, 1996, pp. 142-147.

* cited by examiner

010004:00.9Z JAN 1980
L/L 3845.ON/07730.OW
ALT 0.00 0.00
C/S 0.00 0.00

FRQ/DPL 2010.0 60.0
AMP/SHR -72.85 -4.00
CYC 121
PWR -50
CXL 0
NFL -68 0 #PK 11

LISP

| ID | DPL | BRG | SN | SP | CD |
|---|---|---|---|---|---|
| 7300 | 55 | 0 | 35 | -33 | 0 |
| 8300 | 52 | 0 | 35 | -33 | 0 |
| 6300 | 46 | 0 | 30 | -37 | 0 |
| 7200 | 37 | 0 | 27 | -40 | 0 |
| 6500 | 103 | 0 | 6 | -62 | 0 |
| 3900 | 11 | 0 | 25 | -43 | 0 |
| 8700 | 112 | 0 | 9 | -58 | 0 |
| 3400 | -7 | 0 | 21 | -47 | 0 |
| 3000 | -21 | 0 | 12 | -56 | 0 |
| 1700 | -63 | 0 | 8 | -60 | 0 |
| 1100 | -90 | 0 | 6 | -62 | 0 |

SHUTTLE DESTRUCT DATA

DESTRUCT DURING SRM FIRING (73 sec)

| TYPE | PIECE #S | OBJECT | IMPARTED DELTA-V (ft/sec) | ALPHA (deg) | WEIGHT (lbs) | AREA (m**2) | BALLISTIC COEFF (lb/ft**2) | # OF PIECES |
|---|---|---|---|---|---|---|---|---|
| 1 | 1, 2 | SRB | 400 | 0, 5 | 1.2 M | 200 | 300 | 2 |
| 2 | 3 THRU 12 | EFT CASE FRAGMENTS | 400 | 90 | 1000 | 50 | 100 | 10 |
| 3 | 13 | CREW CABIN | 10 | 10 | 40k | 50 | 200 | 1 |
| 4 | 14 THRU 17 | ORBITTER DEBRIS | 20 | 90 | 1000 | 50 | 100 | 4 |
| 5 | 18, 19 | ORBITER WINGS | 20 | 100 | 10k | 70 | 150 | 2 |

FIG.8

TITAN DESTRUCT DATA

STEP 0 (DESTRUCT SRMs)

| TYPE | PIECE #S | OBJECT | IMPARTED DELTA-V (ft/sec) | ALPHA (deg) | WEIGHT (lbs) | AREA (m**2) | BALLISTIC COEFF (lb/ft**2) | # OF PIECES |
|---|---|---|---|---|---|---|---|---|
| 1 | 1, 2 | SRM MOTOR CASE | 0, 5 | —, 5 | 89.4k | 200 | 163 | 2 |
| 2 | 3, 4 | TVC INJECTANT TANK | 0, 5 | —, 5 | 4.2k | 11 | 248 | 2 |
| 5 | 8 THRU 17 | SRM MOTOR SEG STRIPS | 240 | 90 | 50 | 2 | 25 | 10 |

STEP 1 (DESTRUCT STAGE 1)

| | | | | | | | | |
|---|---|---|---|---|---|---|---|---|
| 6 | 18 | FWD OX TANK | 37 | 0 | 4581 | 35 | 29 | 1 |
| 7 | 19 | AFT OX TANK | 55 | 150 | 2038 | 20 | 40 | 1 |
| 8 | 20, 21 | ENGINE/TRUSS | 18 | 180 | 2798 | 25 | 237 | 2 |
| 9 | 22 THRU 25 | LONGERON TIE | 68 | 90 | 134 | 3 | 19 | 4 |
| 10 | 26, 27 | BOATTAIL ASSEMBLY | 93 | 170 | 370 | 7 | 8.4 | 2 |

STEP 2 (DESTRUCT STAGE 2)

| | | | | | | | | |
|---|---|---|---|---|---|---|---|---|
| 11 | 28 | "PIECE I" | 41 | 0 | 3784 | 30 | 96 | 1 |
| 12 | 29 | "PIECE II" | 57 | 90 | 1947 | 20 | 39 | 1 |
| 13 | 30 | ENGINE | 38 | 180 | 1411 | 15 | 100 | 1 |
| 14 | 31 THRU 50 | PANELS | 145 | 90 | 95 | 3 | 6 | 20 |

PAYLOAD (ACCOUNT FOR PAYLOAD DESTRUCT)

| | | | | | | | | |
|---|---|---|---|---|---|---|---|---|
| 3 | 5 | PAYLOAD | 0 | — | 10k | 20 | 100 | 1 |
| 4 | 6, 7 | PAYLOAD SHROUD | 50 | 0, 5 | 2k | 60 | 50 | 2 |

FIG.9

| # | IMPACT TIME (sec) | POSITION OF IMPACT (km, ECF) | | | IMPACT DIST FROM LAUNCH (km) | POSITION OF IMPACT (LAT/LON. GEOCENTRIC) | |
|---|---|---|---|---|---|---|---|
| 1 | 214 | 945.077 | -5520.77 | 3040.17 | 32.8753 | 28.4924 | -80.2859 |
| 2 | 214 | 945.114 | -5520.85 | 3040.00 | 32.8816 | 28.4907 | -80.2857 |
| 3 | 233 | 931.754 | -5524.95 | 3037.08 | 18.9204 | 28.4598 | -80.4274 |
| 4 | 231 | 931.416 | -5522.72 | 3041.16 | 19.3679 | 28.5019 | -80.4271 |
| 5 | 230 | 931.794 | -5523.03 | 3040.41 | 19.5267 | 28.4942 | -80.4238 |
| 6 | 234 | 931.588 | -5525.09 | 3036.90 | 18.7423 | 28.4580 | -80.4293 |
| 7 | 239 | 929.943 | -5522.57 | 3041.84 | 18.1606 | 28.5088 | -80.4417 |
| 8 | 232 | 931.947 | -5524.67 | 3037.42 | 19.1467 | 28.4635 | -80.4250 |
| 9 | 235 | 931.569 | -5525.02 | 3036.86 | 18.7355 | 28.4579 | -80.4294 |
| 10 | 244 | 929.431 | -5523.91 | 3039.54 | 16.9317 | 28.4853 | -80.4491 |
| 11 | 238 | 930.068 | -5522.54 | 3041.92 | 18.3064 | 28.5095 | -80.4403 |
| 12 | 241 | 830.273 | -5525.10 | 3037.27 | 17.4307 | 28.4618 | -80.4426 |
| 13 | 213 | 936.735 | -5522.60 | 3039.72 | 24.3267 | 28.4871 | -80.3732 |
| 14 | 236 | 931.125 | -5523.86 | 3039.25 | 18.5585 | 28.4820 | -80.4319 |
| 15 | 236 | 931.145 | -5523.83 | 3039.26 | 18.5850 | 28.4822 | -80.4317 |
| 16 | 237 | 931.024 | -5523.70 | 3039.44 | 18.5140 | 28.4843 | -80.4327 |
| 17 | 236 | 931.065 | -5523.73 | 3039.51 | 18.5526 | 28.4847 | -80.4323 |
| 18 | 221 | 934.154 | -5523.06 | 3039.72 | 21.7189 | 28.4870 | -80.4000 |
| 19 | 221 | 934.230 | -5523.14 | 3039.50 | 21.7558 | 28.4849 | -80.3994 |

* THESE RELATIVE TIMES ARE WITH RESPECT TO THE OBTAINED PROFILE'S START TIME, 14 SECONDS INTO THE FLIGHT

SYSTEM AND METHOD FOR DOPPLER TRACK CORRELATION FOR DEBRIS TRACKING

CROSS REFERENCE TO RELATED APPLICATIONS

This application claims benefit of U.S. Provisional Application No. 60/354,481 entitled "SYSTEM AND METHOD FOR DOPPLER TRACK CORRELATION FOR DEBRIS TRACKING" and filed Feb. 8, 2002, which is hereby incorporated by reference.

BACKGROUND OF THE INVENTION

1. Field of the Invention

The present invention relates to a passive coherent location ("PCL") radar system and method, and more particularly, to a system and method for Doppler track correlation for debris tracking in PCL radar applications.

2. Discussion of the Related Art

The detection and tracking of a target object or objects is typically accomplished with radio detection and ranging, commonly known as radar. Radar systems typically emit electromagnetic energy and detect the reflection of that energy scattered by a target object. By analyzing the time difference of arrival, Doppler shift, and various other changes in the reflected energy, the location and movement of the target object can be calculated.

Due to various advantages, microwaves are primarily used in modern radar system. Microwaves are particularly well suited for their lobe size. Beamwidths of a microwave signal may be on the order of 1 degree, with wavelengths of only a few centimeters.

In addition to situations where it is useful or necessary to detect and track a target object, there are instances where it is beneficial to be able to track the debris created from the intentional or accidental destruction of the target object. Examples may include a Space Shuttle launch or other space lift launch, such as the launch of a satellite or other private or military cargo.

Attempts have been made to develop specialized equipment that detect and track the large number of debris pieces instantaneously created from a single target object. The specialized equipment tends to be expensive to build, operate, and maintain. Radar systems typically require transmitters, as well as receivers. Obviously, the more transmitters required to accomplish a particular mission increases the overall cost of the system and its operation Additionally, due to the limitations of conventional radar, microwave based systems are only able to track a small number, if any, debris pieces. A pulse based radar system scans a field of view and emits timed pulses of energy; therefore, a window exists between each scan and pulse where there is no signal and no ability to determine the existence or location of a particular object. The inability to continually track a piece of debris raises the chance that a tracking system will be unable to track debris or able to differentiate a "high value" debris piece, such as the crew cabin of a Shuttle or the cargo of a space lift launch, from any of the other debris.

These and other deficiencies exist in current debris tracking systems. Therefore, a solution to these problems is needed, providing a debris tracking system specifically designed to accurately detect and track the debris from the intentional or accidental explosion of a target object.

SUMMARY OF THE INVENTION

Accordingly, the present invention is directed to a system and method for Doppler track correlation for debris tracking in PCL radar applications.

The intention of debris tracking is to permit, in the event of a catastrophic or intentionally destructive event, the location of significant components of the vehicle, such as a crew cabin of a Space Shuttle or the potentially sensitive payload of a space lift launch (SLL), as rapidly as possible. Conventional tracking equipment may not track all (or in some cases any) of the debris pieces, and the specialized equipment that can track debris may be expensive to operate and maintain, and have difficulty differentiating the pieces to focus on those of high value.

PCL technology has the ability to detect and accurately track a large number of objects over a significant spatial volume because it operates as a bistatic system with a purview of all objects regardless of range and over a large angular region. In addition, PCL operates by using Continuous Wave (CW) TV or FM transmitter sources; thus the required radio frequency ("RF") energy is always present on the target(s) and the positions of the targets may be updated at a very high rate. PCL also has inherently high velocity accuracy and resolution because of the CW nature of the transmitters; this characteristic is very useful in separating the multiple objects being tracked in a fundamentally different manner that conventional radar performs the task.

PCL permits the detection, location, and accurate position tracking of various targets, including aircraft and missiles, in a totally passive and covert fashion. Although radar-like in function, PCL does not require the radiation of any RF energy of its own, nor does it require a target to be radiating any RF energy in order for it to be detected and tracked. For this reason, PCL is particularly applicable where the attributes of covertness permit one to create a surveillance function even in hostile territory.

In addition to its covertness aspects, use of PCL can provide enhanced detectability of targets because of the extremely high energy of the signals used by the concept. In some cases, inherent sensitivities of up to 2 orders of magnitude greater than radar are possible. Furthermore, there is no scanning mechanism necessary in PCL; for this reason, target updates are not slaved to the mechanical rotation of antennas and all targets may be updated as rapidly as desired. Real-time systems have been built with update rates of 6 per second for all targets within the system purview. Cost of the PCL systems tend to be low when compared with radar, and reliability high because of the lack of need for any scanning or high-energy RF power transmission.

The inherent ability of PCL to provide simultaneous high-quality tracking of multiple objects within a large volume of space is a departure from the method which radar uses for object tracking. With radar, the radar system revisits a multiplicity of objects sequentially by a scanning beam in order to maintain track on the objects. In PCL, the receiver beams are created and processed simultaneously in order to provide wide angular coverage. For this reason, PCL is well suited for debris tracking from intentional or accidental destruction events.

A system and method for tracking debris using Doppler measurements is disclosed. The debris may be the result of an explosion or detachment from an airborne vehicle, such as a Shuttle. The debris should be moving in space with a velocity that may be determined using Doppler shift calculations. The disclosed embodiments use PCL radar principles to determine the position and velocity of the debris. Preferably, the disclosed embodiments utilize at least three commercial TV broadcast signals.

Embodiments of the present invention consider the task of accurately and simultaneously tracking multiple debris pieces and disclose algorithms that permit PCL technology to be used for the accurate and timely tracking of debris from destruction of missile and space launch targets. Use of PCL technology in this fashion permits a very cost-effective capability to be employed as an alternative to expensive special purpose radar systems currently satisfying the debris tracking function.

Embodiments of the present invention disclose that PCL has a capability for debris tracking operations in a cost effective system configuration. The disclosed embodiments show the ability to separate and track each of the individual pieces of debris. The accuracy of the tracking and impact point predictions provide for crew cabin or payload recovery.

After the intentional or accidental destruct event, the disclosed embodiments perform the resolution of the signals from the individual constituent debris components and associate the component signals across the multitude of PCL emitters illuminating the target. When the signals have been associated across at least 3 illuminator frequencies, then the trajectory estimates for those debris pieces may be established and updated.

There is no limit on the number of debris pieces that may be tracked by a PCL system. A monostatic radar system requires a beam directed at each debris piece. In contrast, PCL illuminators provide energy throughout a large spatial volume, and all debris pieces within this volume reflect the energy to the PCL receiver. The number of debris pieces that may be tracked by a PCL system is determined by the size of the debris pieces and the ability to resolve detections for closely spaced debris pieces with similar trajectories.

The PCL illuminators preferred for debris tracking are TV stations due to the potentially high altitude of debris pieces. Since the debris pieces may be at high altitude, it is necessary to use distant PCL illuminators such that the debris pieces are within the elevation beamwidth of the transmission pattern. In order to use FM illuminators, the distance from the FM illuminator to the PCL receiver is restricted such that the direct path signal may be cross-correlated with the target signal. In contrast, use of TV illuminators requires only the transmitted carrier frequency. This allows for the use of remote frequency reference systems for tracking high altitude targets.

The large frequency range of TV illuminators (55.25–885.25 MHz) make it possible to achieve a variety of objectives. Low frequency TV illuminators make it possible to avoid detection of small debris pieces that are of no interest. As an example, consider the sphere of radius 0.5 meters. The maximum RCS occurs in the resonance region at a frequency of 95 Mhz. At lower frequencies in the Rayleigh region, the RCS decreases rapidly with decreasing frequency. Thus, in order to avoid detection of debris pieces with a radius of 0.5 meters or less, TV channels 2–6 should be used. High frequency TV illuminators improve the Doppler resolution of closely spaced debris pieces with similar trajectories. The Doppler measurement is the bistatic range rate scaled by the reciprocal of the wavelength. Thus, high frequencies magnify differences in the bistatic range rate and improve resolution in Doppler.

The exploitation of multiple TV illuminators and/or PCL receivers improves track accuracy and reduces the search area. The large number of TV illuminators throughout the world makes it possible to select a constellation of TV illuminators that are optimized for a particular application. The primary technical challenge is the data association problem for multiple TV illuminators and a large number of debris pieces. The data association algorithms are designed for Doppler measurements alone. First, tracking of Doppler measurements is performed for each combination of TV illuminator and PCL receiver (referred to as a link). For each link, the Doppler measurements corresponding to each debris piece are associated in time. Second, the Doppler measurement tracks corresponding to each debris piece are correlated across links. Third, an extended Kalman filter ("EKF") is used to compute position and velocity tracks for each debris piece and predict impact points.

The tracking algorithm estimates the ballistic coefficient, which assists in discriminating the payload from other debris pieces. A significant source of acceleration for each debris piece is atmospheric drag. In order to include atmospheric drag in the dynamics model, it is necessary to estimate the ballistic coefficient as a component of the state vector. Because the debris pieces have no attitude control, the ballistic coefficient is variable and is updated with each Doppler measurement. The ballistic coefficient is not directly observable from the Doppler measurements. However, when the EKF state covariance is extrapolated, the ballistic coefficient becomes correlated with the position and velocity components of the state vector.

Thus, according to an embodiment of the present invention, a bistatic radar system for debris tracking using commercial broadcast signals is disclosed. The bistatic radar system includes at least one PCL receiver to receive target reflected signals and direct signals from illuminators. The bistatic radar system also includes a digital processing element to implement an algorithm to determine tracking parameters using the Doppler shifts of the signals and correlating the tracks for each debris piece. The bistatic radar system also includes a display element to indicate a location of the debris pieces.

According to another embodiment of the present invention, a bistatic passive radar system for tracking debris is disclosed. The bistatic passive radar system includes an array of antennas to receive direct signals and reflected target signals from the debris. The signals are transmitted from at least three illuminators. The array of antennas may include short-range tracking antennas, long-range tracking antennas and reference antennas. The bistatic passive radar system also includes a plurality of receivers coupled to the array of antennas to receive the signals from the antennas. The plurality of receivers may include narrowband receivers, wideband receivers, and reference receivers. The bistatic passive radar system also includes digital processing elements to receive and digitize the direct the direct and reflected signals, to extract measured parameters from the digitized signals, and to compute trajectories and projected impact points of the debris using the measured parameters. The bistatic passive radar system also includes a display element to display information from the digital processing element.

According to another embodiment of the present invention, a method for validating a bistatic radar system prior to a scheduled launch event is disclosed. The method includes optimizing a transmitter constellation. The method also includes predicting a short-range/long-range handover for antennas with the bistatic radar system. The method also includes verifying operation of transmitter signals to the antennas.

According to another embodiment of the present invention, a method for tracking a piece of debris from a launched vehicle is disclosed. The piece of debris reflects signals generated from illuminators and the target signals are received at a bistatic radar system. The method includes computing a bistatic Doppler shift for each received signal reflected by the piece of debris using the reflected signal and a direct signal from each of the illuminators. The method also includes computing a signal-to-noise ratio for each of the reflected signals. The method also includes determining a track for the piece of debris using the bistatic Doppler shift.

According to another embodiment of the present invention, a method for tracking a piece of airborne debris is disclosed. The debris reflects commercial broadcast signals broadcast by illuminators. The method includes receiving the reflected signals at an antenna array. The antenna array also receives direct reference signals from the illuminators. The method also includes digitizing the signals from the antenna array. The method also includes processing the digitized signals to remove interference, including mitigating co-channel interference. The method also includes generating an ambiguity surface by comparing data from the processed received signals with a set of possible target measurements. The method also includes determining detections with the ambiguity surface. The method also includes determining a Doppler shift for the detections by comparing the reflected signals with the direct reference signals. The detection data includes narrowband Doppler measurements and wideband Doppler and time delay measurements. The method also includes assigning the detections to line tracks. The method also includes associating the line tracks with the piece of debris. The method also includes estimating a trajectory for the piece of debris using a Doppler shift function.

According to another embodiment of the present invention, a method for tracking a detected piece of debris is disclosed. The piece of debris is detected using a bistatic radar system that receives direct and reflected commercial broadcast signals. The method includes determining a Doppler shift from the reflected signals and the direct signals. The method also includes assigning a detection correlating to the piece of debris to a Doppler line track. The method also includes associating the line track to the piece of debris. The method also includes estimating a trajectory for the piece of debris using measurements comprising the Doppler shift. The method also includes predicting an impact point for the piece of debris according to the measurements.

According to another embodiment of the present invention, a method for tracking a plurality of debris pieces is disclosed. The method includes determining a Doppler shift for each of the plurality of debris pieces using the reflected signals and the direct signals. The method also includes assigning a line track for each of the plurality of debris pieces from the reflected signals. The method also includes associating the line tracks to each of the plurality of debris pieces. The method also includes estimating a trajectory for the plurality of debris pieces using Doppler shift measurements from the line tracks. The method also includes tracking the plurality of debris pieces according to the Doppler shift measurements.

A bistatic radar system is disclosed comprising and implementing the following functions. A pre-launch calibration and checkout function that includes optimizing transmitter constellation, predicting short-range/long-range handover, verifying illumination, and polling remote frequency reference signals. A post-launch pre-destruct function that monitors status of the target by receiving the signals originating from the vehicle being launched that includes verifying vehicle detection, pointing a target antenna, and validating the target antenna, and verifying short-range/long-range handover. A post-destruct function operates by gathering appropriate data throughout the time period from before destruction to when the debris are illuminated and received by the system that includes pointing a target antenna, verifying destruct, detecting debris fragments, and associating Doppler tracks. A debris-tracking computation function that computes a state vector for each debris piece. A debris impact computation function that includes computing a projected impact point, and error ellipse.

Embodiments of the present invention disclose the capability of PCL to track multiple objects by reporting on the development and evaluation of algorithms for debris tracking. These algorithms may be initialized by the use of actual target tracks in the pre-destruct time period (using a 6 state trajectory description), and then by applying physical laws to the resulting ensemble of debris objects in order to obtain individual state vector solutions for the resolvable pieces of debris. The state vector solutions are then refined by continuing to process the "received data streams" prior to loss of signal (which occurs as the debris components set below the radio horizon of the emitter or the horizon of the receiver.) Impact point predictions are made and continually updated for each of the pieces throughout their tracking period.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof, as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings:

FIG. 8 illustrates Shuttle destruct debris data;

FIG. 9 illustrates Titan destruct debris data;

DETAILED DESCRIPTION OF THE PREFERRED EMBODIMENTS

Reference will now be made in detail to various embodiments of the present invention, examples of which are illustrated in the accompanying drawings.

Figure 1:
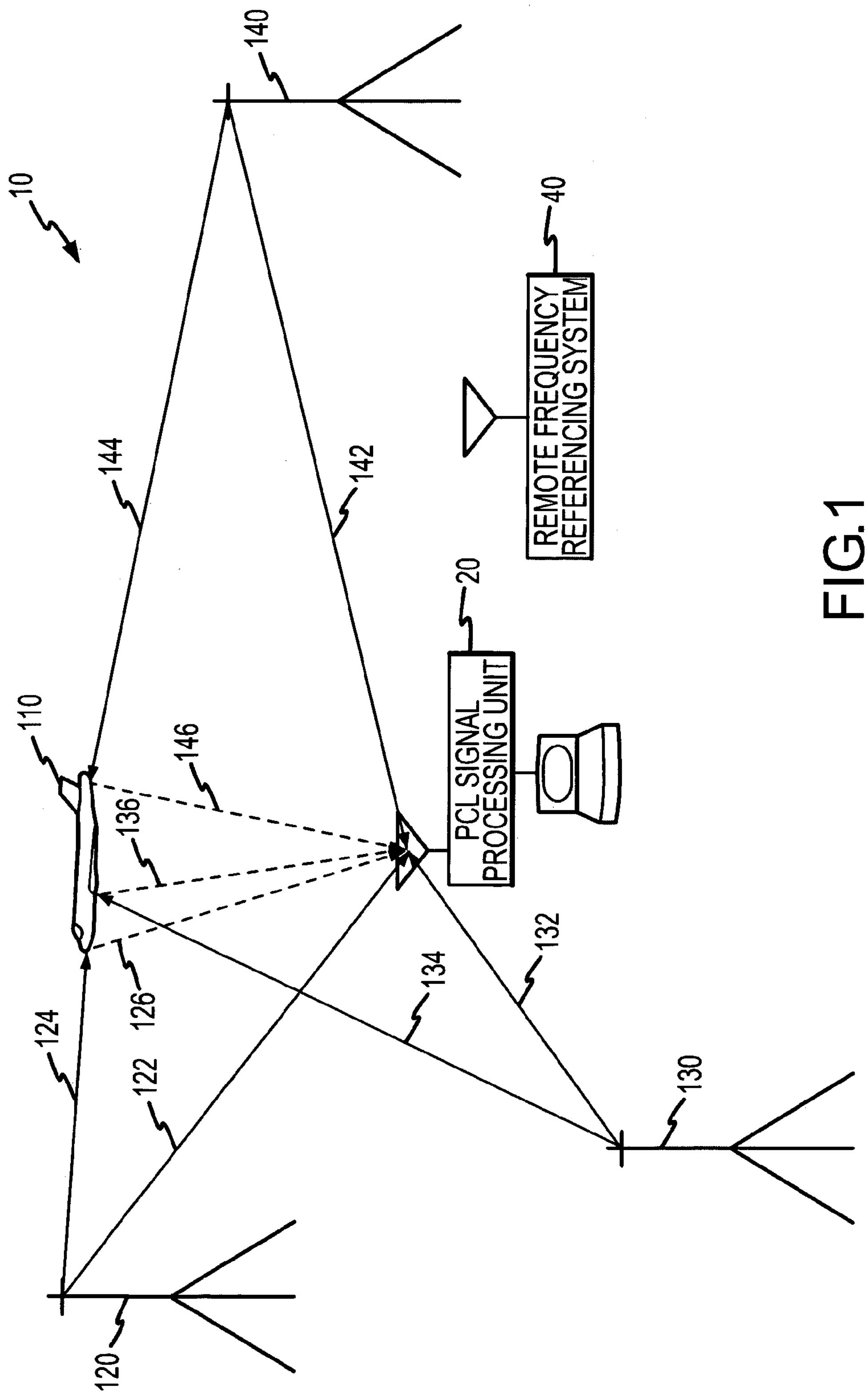
FIG. 1 illustrates a conventional target-tracking PCL configuration.

FIG. 1 shows a conventional PCL target-tracking configuration 10. This configuration 10 includes a PCL signal processing unit 20, a target object 110, and a plurality of transmitters 120, 130, and 140. Accordingly, the PCL signal processing unit 20 receives direct RF signals 122, 132, and 142 broadcast by transmitters 120, 130, and 140, as well as reflected RF signals 126, 136, and 146. The reflected RF signals 126, 136, and 146 are also broadcast by transmitters 120, 130, and 140 and are reflected by the target object 110. FIG. 1 also includes a Remote Frequency Referencing System ("RFRS") 40, an optional component of the present invention, which will be discussed in further detail below.

In a typical target-tracking configuration, the PCL processing unit 20 calculates the time-difference-of-arrival (TDOA), frequency-difference-of-arrival (FDOA) (also known as the Doppler shift), and/or other information from the direct RF signals 122, 132, and 142 and the reflected RF signals 126, 136, and 146 to detect, and track the location of a target object 110.

The various embodiments of the present invention allow PCL technology to be used for the accurate and timely tracking of debris from the intentional or accidental destruction of a target object, such as a missile or space launch vehicle.

Figure 2:
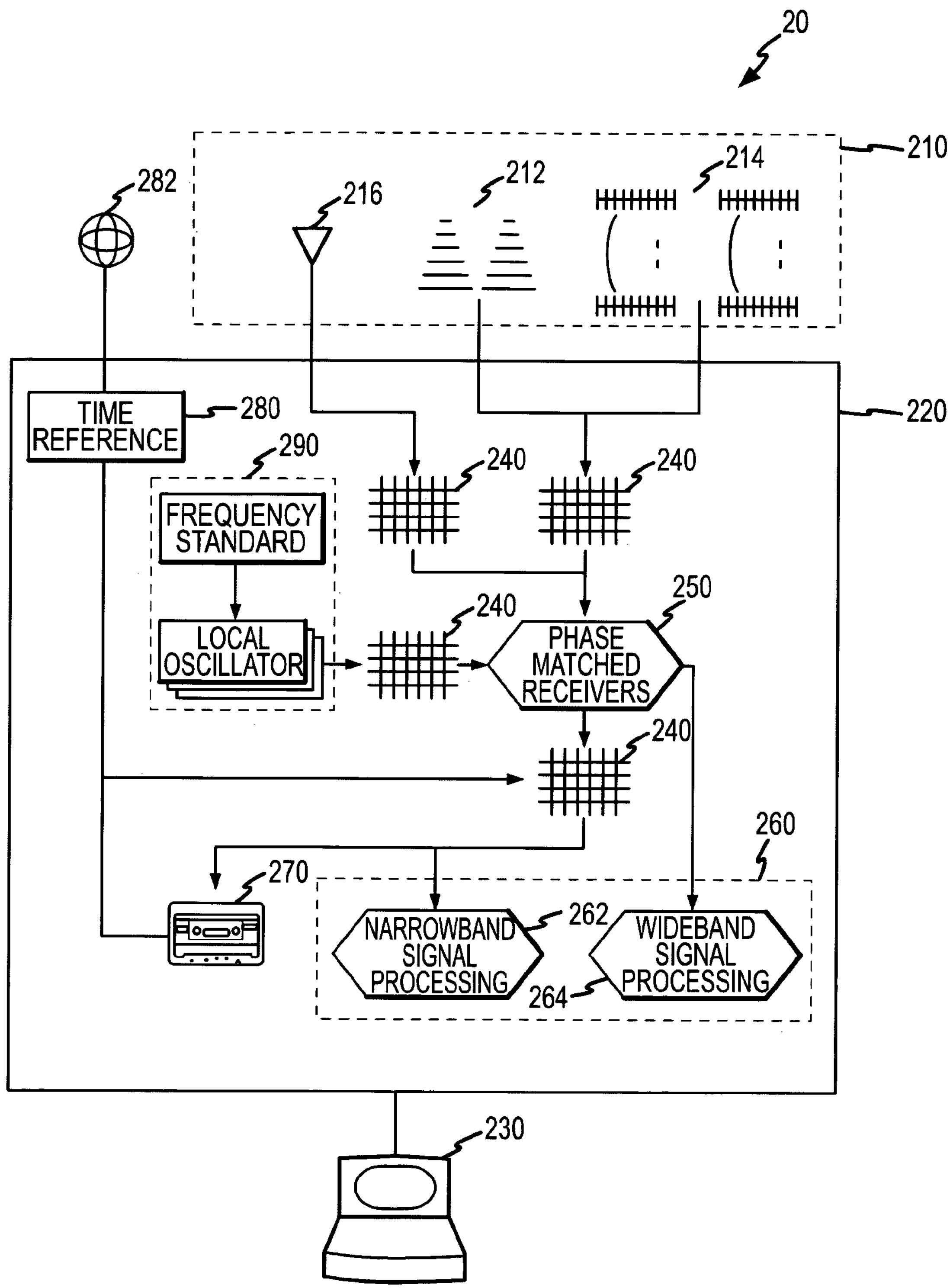
FIG. 2 illustrates a front-end PCL signal processing unit, according to an embodiment of the present invention.

FIG. 2 shows a PCL signal processing unit 20 for use in the tracking of debris, according to an embodiment of the present invention. The PCL signal processing unit 20 may be a single, or multiple, receiving and processing system, and contains external antennas 210 for the reception of the RF signals needed for performing the debris tracking function.

In a further embodiment of the present invention, a RFRS 40 (shown in FIG. 1) is also used to assist the PCL signal processing unit 20 in the debris tracking. The RFRS 40 (shown in FIG. 1) continually monitors the transmitted frequency of some of the transmitters being exploited, as the bistatic RF sources for those transmitters may be at a distance too great to be received at the primary PCL signal processing unit 20.

Turning specifically to FIG. 2, the PCL signal processing unit 20 includes a set of antennas 210, a signal processing segment 220 and display elements 230. An embodiment of the PCL signal processing unit 20 may include mounting the PCL unit 20 in a van-like vehicle for easy transportability.

The antennas 210, according to various embodiments of the present invention, may include short-range tracking antennas 212, long-range tracking antennas 214, and reference antennas 216. The antennas 210 are used to receive a sample of the signals transmitted by the bistatic transmitters being exploited, and to receive the reflected energy from the constituent debris pieces. A further embodiment of the present invention may also include a global positioning satellite ("GPS") antenna 282 for receiving GPS timing data for use as a time reference source.

The short-range antennas 212 are used for tracking debris that may occur early in the launch mission such that the pieces are relatively close to the PCL receiver 20. This debris tends to disburse rapidly in angle because of its proximity to the PCL receiver 20. The short-range antennas 212 therefore have relatively low gain. Preferably, there are two antennas each, fixed and pointed from nominal trajectory. These may be combined (FM/VHF/UHF) on a single mast. The short-range antennas may have the following parameters:

| Freq | Gain (dBi) | Beamwidth (Deg) |
|---|---|---|
| VHFL | +6 | 60 |
| FM | +7 | 55 |
| VHFH | +10 | 40 |
| UHF | +12 | 35 |

The long-range tracking antennas 214 are used as the distance between the PCL receiver 20 and the target increases. As the vehicle of interest recedes from the launch point, two potential changes drive the size of the receiving apertures:

a) If a destruct occurs, the constituent debris pieces may be confined to a smaller regime of subtended angle from the PCL system; and b) The pieces, being at an increased range from both the illuminator and receiver, may require higher receive antenna gain to maintain target signal-to-noise ratio ("SNR").

Fortunately, these two phenomena vary by exactly the same function of range. Therefore, an antenna with a higher gain may maintain the SNR without losing any debris pieces as they diverge from the point of a destruct event. The long-range tracking antennas 214 provide this increased gain. In a preferred embodiment, two-7 ft dish antennas are disposed horizontally and offset by 7 ft for UHF with four total VHF log-periodic, one on the top and the bottom of each of the dish antennas. The long-range tracking antennas 214 may have the following parameters:

| Freq | Gain (dBi) | # | Az Bw (deg) | El Bw (deg) |
|---|---|---|---|---|
| VHFL | +16 | 4 | 30 | 30 |
| FM | +16 | 4 | 30 | 30 |
| VHFH | +19 | 4 | 20 | 20 |
| UHF | +18 | 2 | 10 | 20 |

The reference antennas 216 receive a portion of the energy radiated by the bistatic transmitter being exploited. A moderate degree of directivity may be used to permit determination of the approximate direction of arrival of the signal as confirmation of correct identification of the transmitter. Preferably, there are four reference antennas 216, fixed and pointed over an azimuth region encompassing the possible illuminators within 300 km of the launch. The reference antennas 216 may have the following parameters:

| Freq | Gain (dBi) | Beamwidth (Deg) |
|---|---|---|
| VHFL | +6 | 60 |
| FM | +7 | 55 |
| VHFH | +10 | 40 |
| UHF | +12 | 35 |

The PCL signal processing segment 220 of the PCL signal processing unit 20, depicted in FIG. 2, comprises signal distribution elements 240, receivers 250, digital signal processing element 260, recorders 270, referencing support 280, and frequency standard 290. The signal distribution elements 240 manage the flow of analog data through the system 20. The multi-channel phase matched receivers 250 band limit, frequency shift, and amplify the received signal data. Since the processed signal data must be frequency compared to data extracted from the RFRS 40 when in use, the high precision frequency standards 290 are used to discipline the receivers 250 at both the PCL site 20 and the remote RFRS site 40 (shown in FIG. 1).

The PCL signal processing unit 20 includes high quality receivers 250 to receive the signals at the PCL system 20. The receivers 250 include target receivers and reference receivers. The target receivers are those used to receive the signals reflected by the debris. The reference receivers receive the direct signals from the illuminators. Preferably, there are six narrowband image rejection receivers, 3 channels per receiver. The narrowband image rejection receivers may have the following parameters:

| Freq | Noise Figure (dB) | Bandwidth Phase Noise (Khz) |
|---|---|---|
| VHFL | 6 | 2 |
| FM | 4 | 60 |
| VHFH | 3 | 6 |
| UHF | 3 | 20 |

For narrowband PCL, the receivers 250 may split the three co-channel offsets of the base illuminator frequency into three 5-KHz-wide channels to avoid DC foldover artifacts and co-mingling of signals. For wideband PCL, one frequency channel with a 50 KHz IF bandwidth may be extracted to provide enough bandwidth for delay processing.

The narrowband PCL data may be recorded for post event analysis on two commercial 8-channel Digital Audio Tape "DAT" recorders 270. One channel on each recorder 270 is dedicated to an Interrange Instrumentation Group ("IRIG") timing reference provided by the time reference 280. Wideband PCL typically exploits too much bandwidth to practically record raw signal data for other than brief durations.

The signals from the antennas 210 are received by the receivers 250 and presented to the Digital Processing Element ("DPE") 260. This element performs the required signal processing to extract measured parameters for the debris components, and uses these measurements to compute the trajectories and projected impact points. The DPE may include a narrowband processing element 262, a wideband processing element 264, or both.

The DPE hardware consists of temporary RAM data storage, permanent non-volatile storage, high-speed data transfer media, signal conditioning and filtering multiplication/accumulation registers, high-speed array processor computation elements, and general-purpose computation elements. The architecture of this hardware is compliant with the required speed and accuracy to perform the computations required for accurate tracking of the debris constituents.

Returning to the overview of the PCL processing unit 20, the display element 230 provides the means for displaying both system status messages and data in a form to aid in the diagnosis and rectification of hardware and/or software failures in the PCL system. High-resolution and medium resolution graphics display terminals 230 are employed in a manner to minimize diagnosis and maximize intelligibility of the data being analyzed for help in hardware/software fault location, isolation, correction, and verification.

Figure 3:
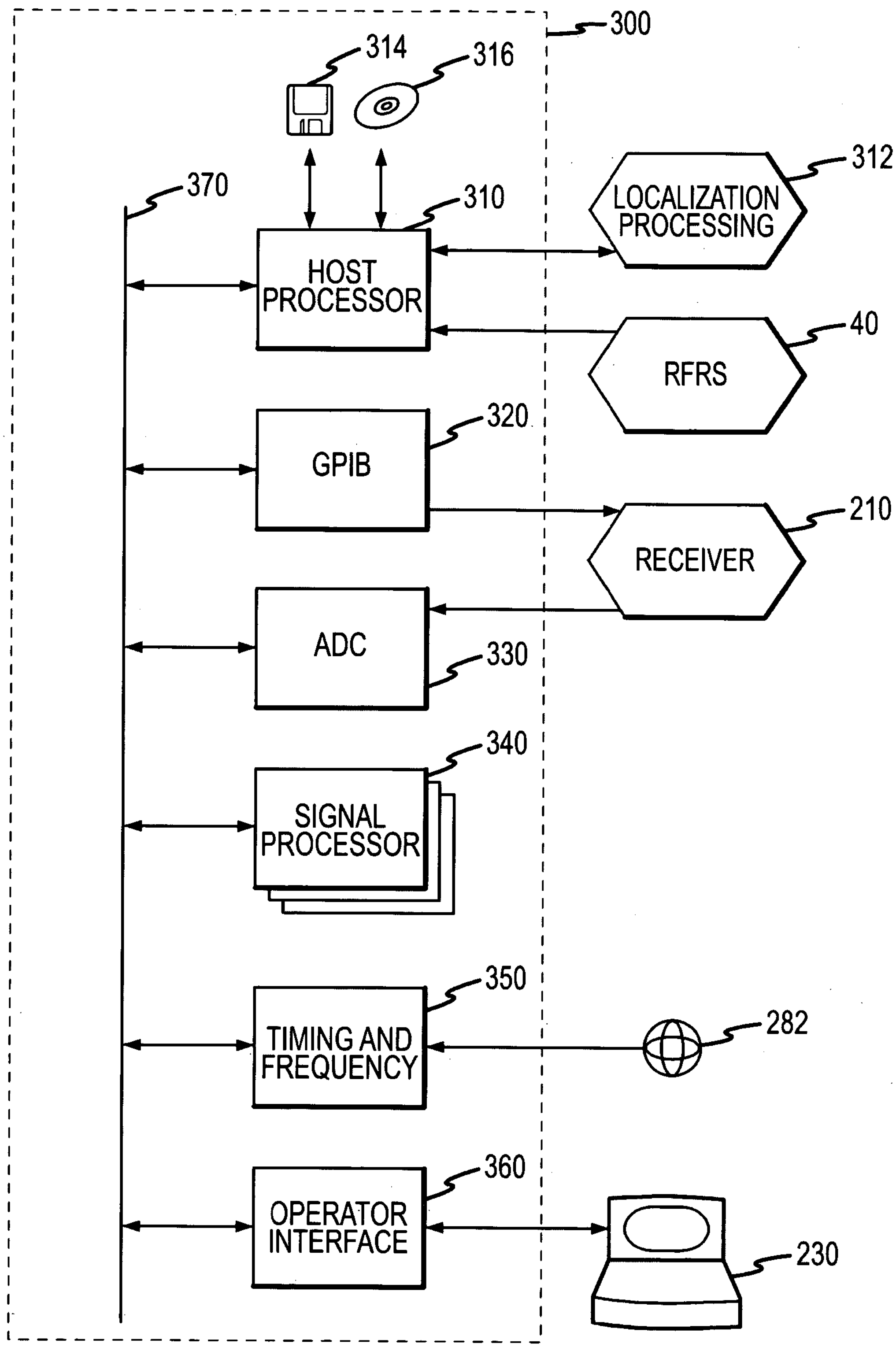
FIG. 3 illustrates a digital signal processing unit, according to an embodiment of the present invention.

FIG. 3 shows a detailed view of the DPE or processing suite 300, according to an embodiment of the present invention. The components of the processing suite 300 communicate over a VersaModule Eurocard (VME) bus 370. The processing suite 300 includes a host processor 310 connected to various storage media 314 and 316 over a SCSI interface and is responsible for:

a) System startup;
b) Timing and control;
c) Association of frequency tracks with the illuminating carrier;
d) Line tracking of the missile or debris. This tracking occurs in Doppler and delay space and is converted to position and velocity tracks by the track processor 312;
e) Communications with the track processor 312 and with the RFRS(s) 40; and
f) The signal processing segment operator-machine interface 360. This interface is intended for development and diagnostic use only and would not be used under normal operations.

The processing suite also includes a GPIB board 320, an analog to digital ("ADC") board 330, signal processors 340, a timing board 350, and an operator interface 360. The signal processing boards 340 are responsible for processing the receiver data to detections. The GPIB board 320 provides the principal control interface to the receivers 210, while the ADC boards 330 capture the signal data from the receiver 210. The timing board 350 consists of a BANCONN GPS timing board, which allows precision time referencing of the signal data (alternately IRIG may be used or generated) as well as providing a precision frequency reference which may be used to discipline the receivers.

The exact time of each dwell, and the observations of the target, is determined using a precision clock disciplined to Universal Time, Coordinated ("UTC") as derived from the use of a Global Positioning System (GPS) 282. Comparisons of exact instantaneous frequencies between the transmitted carrier and the target return are used to deduce the Doppler shift of the target. For close-in illuminators whose direct path is directly measurable by the targeting antennas, the design of the receiver may ensure no signal processing biases between the carrier and target return frequencies.

Figure 4:
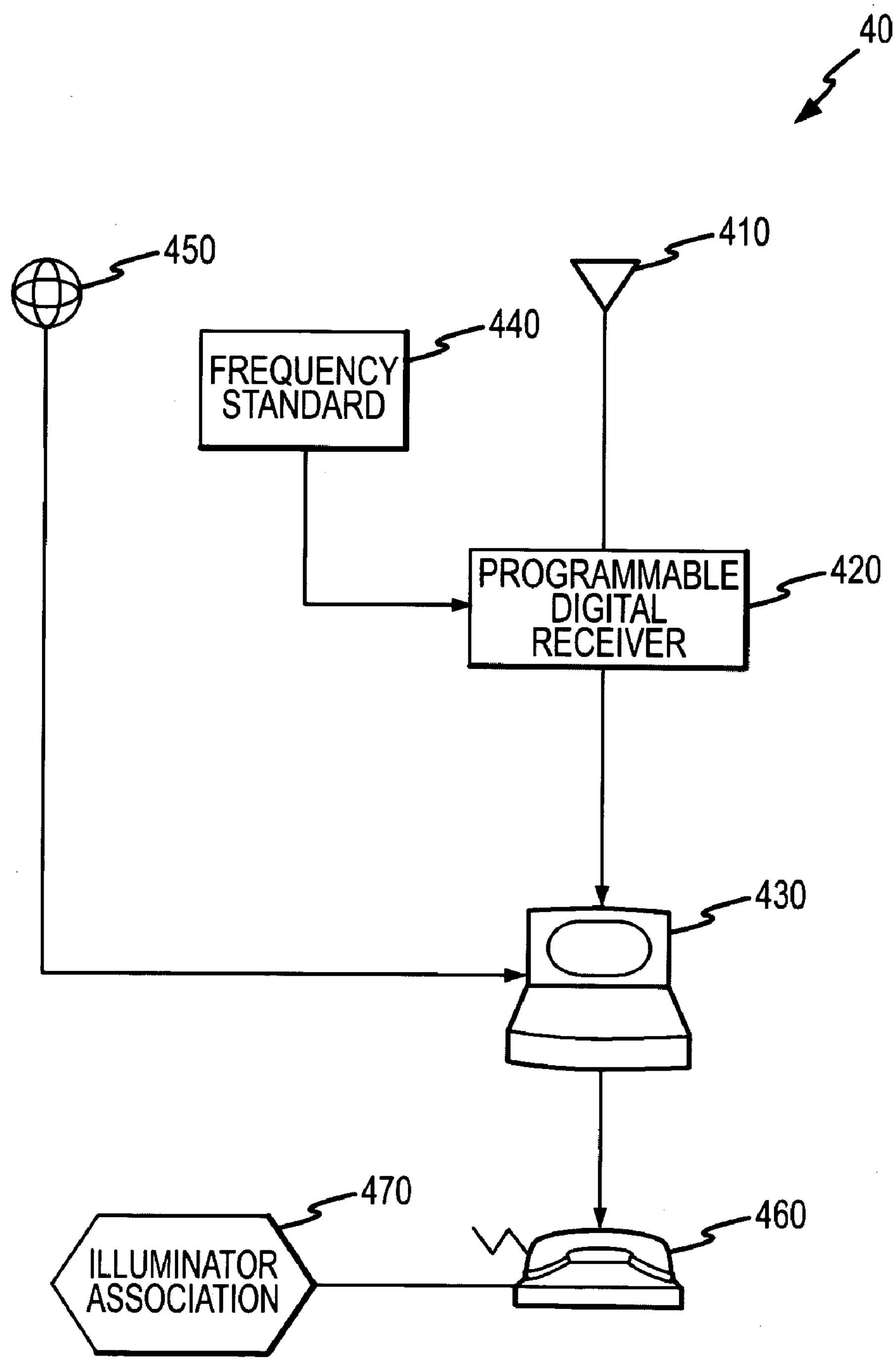
FIG. 4 illustrates a Remote Frequency Referencing System, according to an embodiment of the present invention.

FIG. 4 shows a Remote Frequency Referencing System 40, according to an embodiment of the present invention. In some instances certain portions of the flight regime of the vehicles being monitored for debris tracking may require the use of transmitters at a considerable distance from the primary PCL installation 20 (shown in FIG. 1). For more distant illuminators, the carrier frequency cannot be measured directly at the PCL site 20. In this case, a RFRS 40 (shown in FIG. 1) is used to measure the absolute frequency plus other characterizing information of the transmitted waveform. The RFRS 40 then transmits this information to the PCL site 20. The function of the RFRS 40 is to enable real-time exception reporting of current carrier frequencies of illuminators at distance greater than a predetermined distance from PCL signal processing unit 20 (shown in FIG. 2). A precision frequency reference 440 is used to discipline the receiver's local oscillators in the same manner as at the PCL site 20 to ensure the accurate reconstruction of the Doppler shift.

The RFRS 40 consists of an integrated set of standard components, including antennas 410, a programmable digital receiver 420, a processing unit 430, a frequency reference 440, a GPS receiver 450, and reporting connections 460. The RFRS 40 performs the task of accurately quantizing the absolute transmitted frequency of the illuminators being used. The system may be unmanned, automatic, and self-diagnosing for fault detection/fault isolation ("FD/FI") purposes. Redundancy in selection of the requisite illumination constellation for distant illumination protects against the loss of a single RFRS 40 during launch critical operations.

For transmitters close to the PCL receive site 20, the waveform statistics calculated by the RFRS 40 are measured from the direct path energy at the PCL site 20 and the RFRS 40 is not needed. For distant illuminators from which the PCL site 20 cannot measure the critical parameters due to the path loss, the RFRS 40 is used. The statistics calculated by the RFRS 40 are communicated through the reporting connection 460 to the PCL site 20 for use by the data association logic 470 for narrowband PCL. The basic statistics provided to narrowband PCL are:

a) UTC time of measurement, as derived from GPS time and thus comparable to the PCL system's time;

b) Carrier frequency of the transmitted waveform, as derived from the precision frequency standard and thus comparable to PCL system's frequency measurement;

c) Measured power of the received carrier signal; and d) Location of the RFRS.

Figure 5:
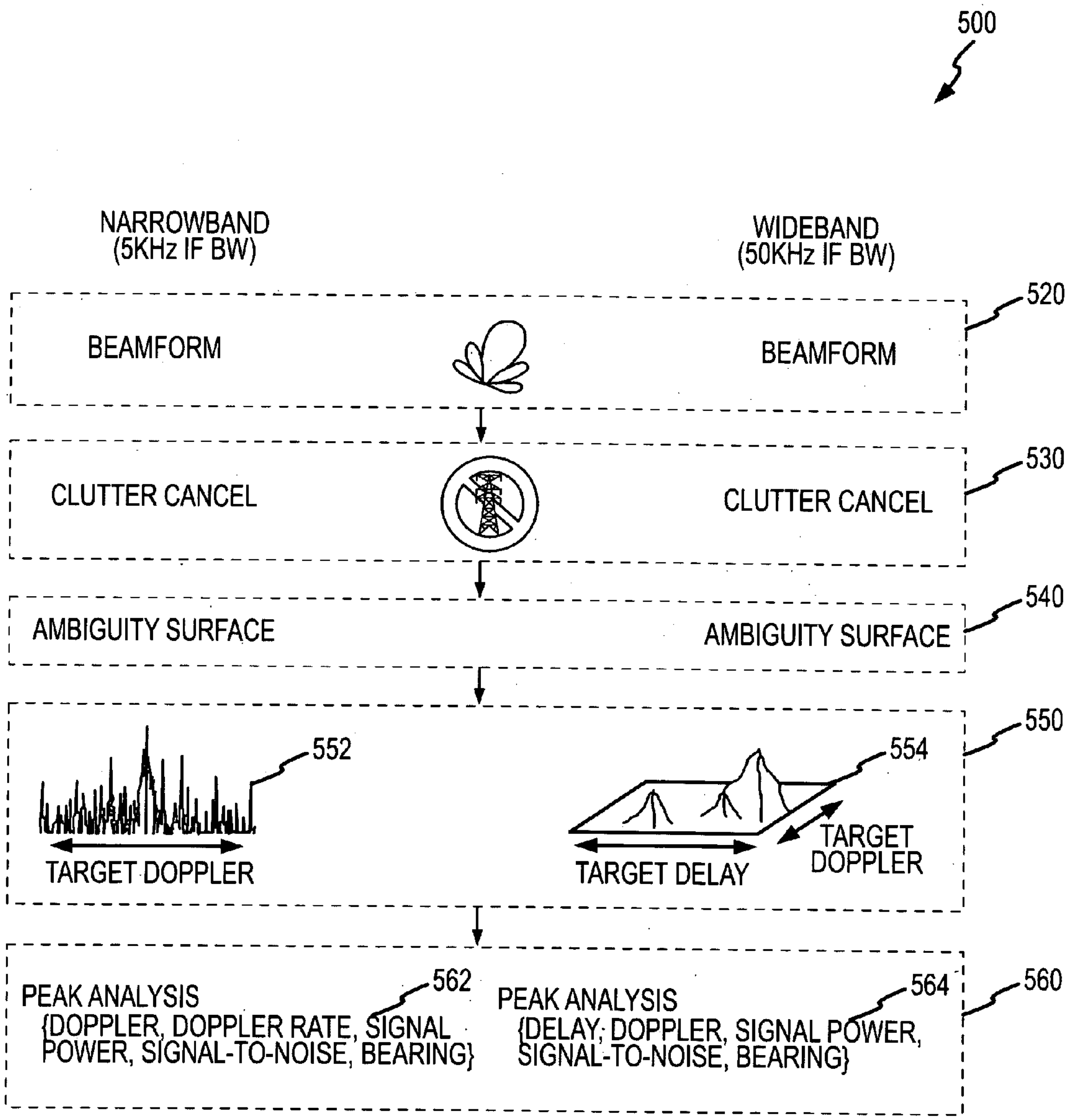
FIG. 5 illustrates signal processing steps and PCL processing variants, according to embodiments of the present invention.

FIG. 5 shows the processing steps 500 for narrowband and wideband signals, according to embodiments of the present invention. Two types of RF signals are exploited in PCL for the debris-tracking problem. In the first type, known as narrowband PCL, a monochromatic CW signal is used as an illuminator and the Doppler shift of the energy scattered off the target is measured. In the second type, known as wideband PCL, a modulated carrier is used as an illuminator and the time delay and Doppler shift of the energy scattered by the target is measured. The basic processing steps are similar, although the details of clutter suppression, cancellation and ambiguity surface generation and processing vary. In general, the advantages of narrowband PCL over wideband PCL are that it requires less processing hardware. Its disadvantage is that it is more difficult to localize targets.

As discussed previously, the signal processing segment is responsible for detecting and characterizing energy from the contacts of interest. Its principal input is a RF feed from the antennas and its principal output is Doppler information from various illuminators to characterize the target tracks.

The analog front end of the signal processing segment is a multi-channel phase matched receiver 250 (shown in FIG. 2). For each antenna element of the phased array, the receivers band limit, amplify and frequency convert the target signals to near-base-band. For narrowband illuminators, signal returns from the three co-channel center frequency offsets are split into separate offset channels.

Once digitized, the channel data is processed to remove clutter. In step 520, adaptive beamformation techniques, also known as spatial nulls or power inversion beamforming, are used to suppress direct path returns from nearby co-channel illuminators, which would otherwise raise the system noise floor. For wideband processing, multiple delay tap adaptive filters are used to remove ground clutter.

The ultimate limit to target detectability is thermal noise, at roughly −174 decibels per Hertz with respect to 1 milliwatt (dBm/Hz). The noise floor can be elevated, and thus the target SNR is reduced by AM modulated video noise from local transmitters at the same base frequency. Adaptive beamformation techniques are used to digitally steer a null towards this noise source.

In step 530 additional clutter cancellation techniques may also be used. An otherwise detectable target can also be masked by a stronger return in a nearby detection cell. In general, separate energy returns can only be resolved if there are 5 or 6 detection cells apart. In Doppler space, a detection cell is defined as the reciprocal of the coherent integration time ("CIT"). Detection cell separation may be increased by exploiting a transmitter with a higher frequency and/or by increasing the coherent integration time. If a higher frequency transmitter is used, then more fragments will occur above the Raleigh region and thus be visible.

The optimum coherent integration time without de-chirping is equal to the reciprocal of the square root of the Doppler rate, which for most of the debris simulations occurs at about 1 sec, providing a 1 Hz Doppler detection cell. Using de-chirp processing, longer integration times can be used at the expense of smearing of the contacts which do not meet the de-chirp hypothesis. The optimum coherent integration time with de-chirp for targets approximately at the hypothesized chirp rate is utilized when the Doppler rate otherwise would cause smearing outside of a single detection cell.

After clutter cancellation has completed, an ambiguity surface is generated in step 540 comparing the received signal data with an encompassing set of possible target measurements. This ambiguity surface is analyzed and peaks exceeding a false alarm threshold are passed as detections.

For narrowband, peaks on this ambiguity surface are passed to the data association logic. Target hypotheses are generated for frequency and frequency rate in step 552. These measurements are then associated with the transmitted carrier center frequency, as measured either locally or using the autonomous RFRS 40 (shown in FIG. 4), to determine the target bistatic Doppler shift and Doppler rate. The state measurements generated by narrowband PCL in step 562 for a given detection may be:

a) time b) Doppler shift from a specified transmitter c) Doppler rate from a specified transmitter d) angle of arrival information if a phased array is used e) signal power and signal to noise ratio.

Figure 6:
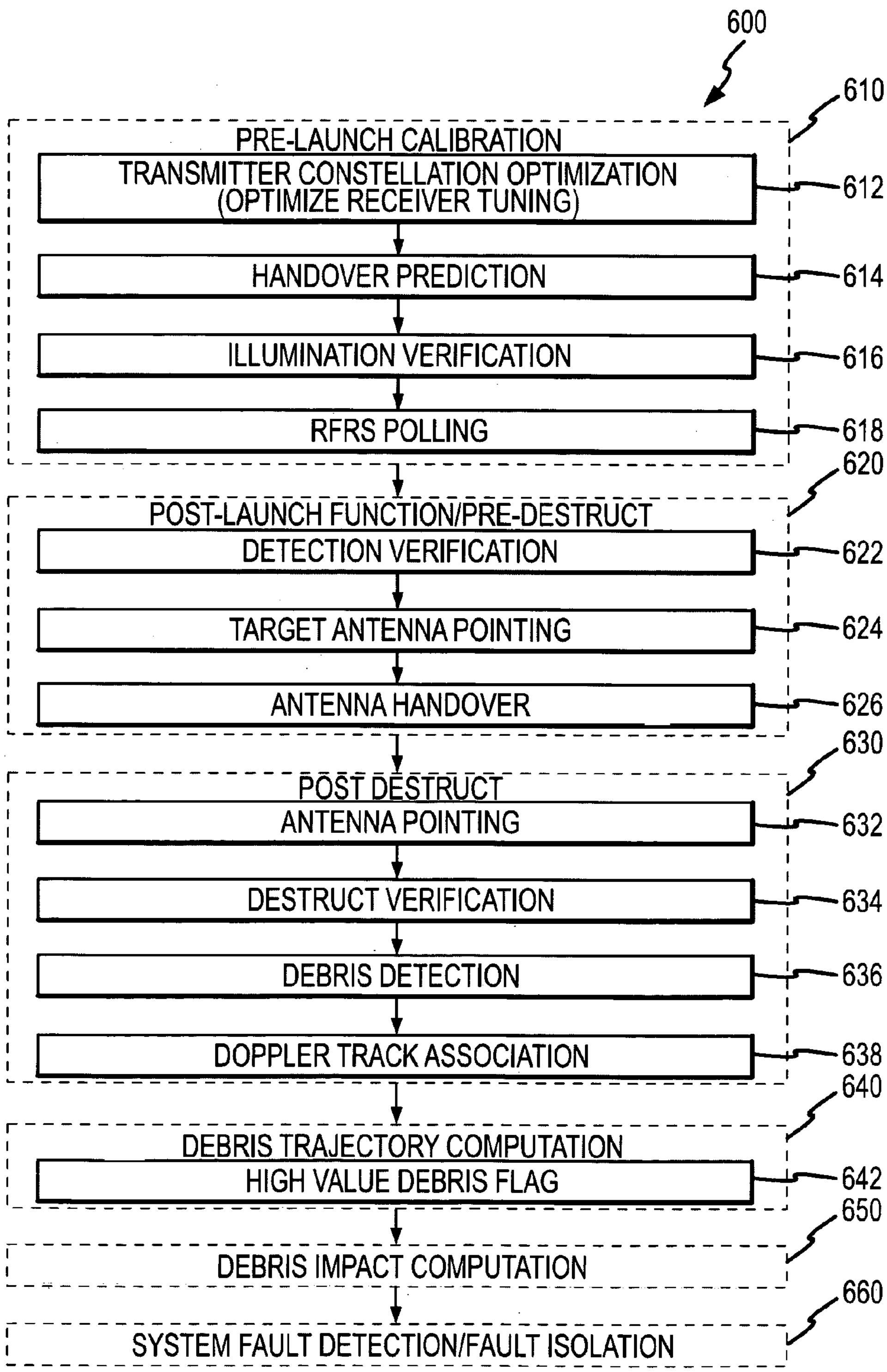
FIG. 6 illustrates a processing flow diagram according to an embodiment of the present invention.

For wideband PCL target hypotheses are generated in time delay and Doppler space step 554. These hypotheses are applied by means of a dynamic matched filter for target detection. This additional measurement state is particularly useful for tracking and localization due to the bistatic-range information. The state measurements generated in step 564 by wideband PCL for a given detection may be:

a) time b) Doppler shift from a specified transmitter c) time delay from a specified transmitter d) angle of arrival information if a phased array is used e) signal power and signal to noise ratio FIG. 6 shows a flow diagram 600 depicting further details of the processing steps associated with using the PCL system for tracking debris, according to an embodiment of the present invention. Embodiments of the PCL system are intended to operate by gathering appropriate data throughout the time period from pre-destruction of the target vehicle through the full time window of post-destruction, i.e. the transmitters being used are illuminating the post-destruction debris pieces and the signals reflected by the debris are received by the PCL system. Accordingly, data processing by the PCL system can be divided into various processing stages including a pre-launch calibration step 610, a post-launch/pre-destruct functions step 620, a post-destruct functions step 630, a debris trajectory computation step 640, a debris impact computation step 650, and a system fault detection/fault isolation step 660.

In one embodiment of the present invention a pre-launch calibration processing step 610 validates the PCL system as mission-ready prior to the beginning of a scheduled launch event. Functionality associated with the pre-launch calibration step 610 includes a transmitter constellation optimization step 612, a handover prediction step 614, an illumination verification step 616, and a RFRS polling step 618.

The transmitter constellation optimization step 612 optimizes a nominal receiver tuning schedule from a SNR and measurement accuracy viewpoint, using nominal missile launch trajectory, and validated illumination elevation patterns.

The short-range/long-range handover prediction step 614 calculates estimated locations for optimal antenna handover. After a certain point in the mission, the short-range, low gain, wide-angle antennas may no longer provide satisfactory signal reception for debris components. At this point, a switchover is made to a higher gain target antenna system. The handover prediction step 614 prepares the PCL system for the timing of the handover.

The illumination verification step 616 verifies proper operation of the transmitters being utilized, including their frequency and approximate received signal levels. Using the nominal illuminator tuning schedule optimized in the transmitter constellation optimization step 612, the PCL system is able to verify direction, received frequency, and amplitude of constellation members.

If the received nominal frequency and power level are verified, this may be indicated in the available illuminator data base with a status flag value corresponding to the highest state of availability, such as "currently nominal and confirmed."

Embodiments of the present invention may also go to a pre-computed table of alternate illuminators, and tune the referencing system to acquire and verify the parameters of an alternate illuminator. Once verified, the disclosed embodiments may also place a pointer in the "unverified" illuminator status register to point to the alternate illuminator as the substitute.

The RFRS Polling step 618 connects the PCL processing unit to the RFRS at population centers required based on analysis of the nominal trajectory. The disclosed embodiments may receive frequency reports, statistics and go/no-go flags on use of each emitter.

Turning to the post-launch/pre-destruct processing step 620, the status of the PCL system is monitored by receiving the signals originating from the target vehicle. Functionality associated with the post-launch/pre-destruct functions of step 620 includes a detection verification step 622, a target antenna pointing step 624, and an antenna handover step 626.

The vehicle detection verification step 622 of the disclosed embodiments may verify reception of target signals at correct Doppler and compare received amplitudes with prediction using state vectors from the range to forward predict Doppler.

During the target antenna pointing step 624, the high-gain/long-range target antennas may be pointed at the vehicle during nominal flights in order to be at the optimal angles for performing early debris tracking capability. In one embodiment, target antenna pointing step 624 occurs continually during flight of the target vehicle. The correct pointing of the high-gain target antenna may be verified by examining the signals being received from the target vehicle during normal portions of its trajectory.

The short-range/long-range antenna handover step 626 verifies continuity of signals prior to handover from the short-range antenna group to the long-range antenna group. The disclosed embodiments may verify handover prediction time and handover to the long-range antennas, one channel at a time.

Once a target is destroyed, whether intentionally or accidentally, the PCL system turns to the post-destruct processing step 630. Post-destruct processing step 630 includes an antenna pointing step 632, a destruct verification step 634, a debris detection step 636, and a Doppler track association step 638.

Target antenna pointing step 632 directs the target antenna to the focal point of the debris. The pointing of the target antenna may allow for reception of the reflected signals from all of the debris components. This function may be performed in real-time to assure adequate information flow into the association and tracking algorithms.

The disclosed embodiments may compare centroid with nominal trajectory projected with no longitudinal thrust. If needed, the disclosed embodiments may re-point the target antenna in azimuth to insure that all debris components are within the azimuth beamwidth of the target antenna.

If the elevation angle of the pre-destruct vehicle is more than a half-beamwidth above the horizon, the disclosed embodiments may point the antenna such that the upper 3 dB point is at the same elevation angle as the pre-destruct vehicle. This assures that the debris pieces, as they fall from the main vehicle, may be within the beamwidth of the target antenna. If the elevation angle of the pre-destruct vehicle is lower than a half beamwidth above the horizon, the disclosed embodiments may point the target antenna at the horizon in elevation.

The destruct verification step 634 ensures that association and tracking algorithms should begin processing data. The disclosed embodiments may look for the latest forward predicted signals from the target vehicle and verify non-existence of these signals to confirm a destruct event.

Once there is verification of destruction of the target vehicle, the disclosed embodiments may begin the debris detection step 636 and Doppler tracking of debris on a band-by-band and illuminator by illuminator basis. Band-by-band detections would proceed with the lowest frequencies first in order to maximize the likelihood of detecting and tracking of the largest pieces, which will likely include the high-value debris such as the Shuttle crew cabin or space lift payloads. Illuminator by illuminator detections may be associated in order to enable computation of state vectors for each significant piece.

After the detection of debris step 636, the association of debris Doppler tracks step 638 is required before position tracks may be established for the debris pieces. It can be appreciated that eliminating the need for different types of measurements minimizes the PCL system complexity. Thus, Doppler-only association is one of the more desirable association techniques.

The associated Doppler data is then used to make the debris trajectory computations in step 640. This step computes a six-element state vector for each debris piece over the full range of observability of the target.

"High Value" debris flags may then be calculated in step 642. When a debris component appears to be a "high value" piece, as determined by either the drag coefficient or by the likely size estimation, this piece may carry a high-value flag as an indicator of relative priority in recovering debris.

In the event a debris target is no longer trackable due to lack of illumination or lack of a suitable RF path from the PCL target antenna to the debris, a projected impact point may be computed in the debris impact computation step 650. The predicted maximum likelihood location, as well as an ellipse representing the Elliptical Error Probability of 50%, may be computed and displayed for each piece.

The system fault detection/fault isolation step 660 may also be used throughout signal processing. Direct path signal leakage into the target antenna channel may be used for continual monitoring of the integrity of the RF channel. Digital test signals may be injected into the data stream in order to stimulate the digital processing subsystem. System status information may be made available continually.

Figure 7:
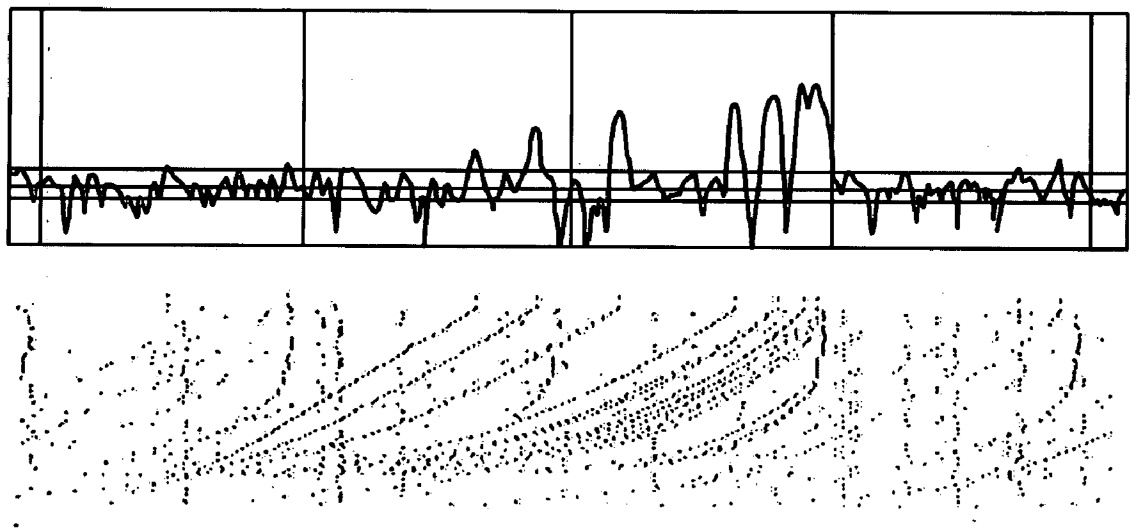
FIG. 7 illustrates an example of a narrowband signal processing display.

FIG. 7 depicts an example narrowband signal processing display. The display shows the time history of the Doppler returns, with the vertical axis being the dwell time and SNR coded by color and intensity.

In this example, the signal processing performance was predicted based on the projections from the signal characterization portion of the event characterization simulator. The time, Doppler, signal power projections are used to produce an example analog-to-digital ("ADC") sample stream which in turn was processed using standard narrowband PCL signal processing logic. The ADC simulator uses the following logic:

a) A waveform is generated with the same statistical characteristics as a normal narrowband illumination waveform.
b) At the beginning of each processing dwell, the measurement channels are initialized with a time domain representation of noise environment. This noise is represented as thermal noise with a constant amplitude of KTBN (Boltzman's constant times the temperature times the Doppler detection cell size times the receiver noise figure) and a random phase.
c) For each track from the kinematics model, the waveform was Doppler shifted and scaled in accordance with the projected SNR and added to the measurement channel.
d) The measurement channel is scaled and quantized in accordance with the operating characteristics of the ADC and stored in a standard ADC format.
e) The stored ADC data is processed by the narrowband PCL software. FIG. 7 depicts a sample display of this data.

The characteristic pattern of debris in the Doppler plot may be that the target Doppler decays towards zero Doppler. The characteristic Doppler time series of each debris piece depends on its delta-V vector and ballistic coefficient. This characteristic allows discrimination against non-debris returns.

Several event characterizations providing examples of an explosion, during powered flight of representative vehicles are also provided. These examples describe the flight of a target, its subsequent explosion, and the trajectories of major debris pieces. At any point in time, the targets are characterized by values for position, velocity, Doppler shift, and signal-to-noise ratio of the illuminator/receiver configuration.

The canonical cases were carefully chosen to exercise the association algorithms using different initial vehicle profiles, as well as to exploit existing data concerning debris characterization. Both cases are based on actual launch trajectories, as well as documented studies involving debris characterization. The following examples are amenable to investigations of any type of launch vehicle by merely updating a single database with appropriate launch/debris values. The cases studied were:

1. Shuttle Launch
   The eastern launch site for the Shuttle was chosen in order to investigate the tracking of debris from a typical manned flight.
   The trajectory for STS 49 provided the basis for event modeling.
   The Presidential Commission's report on the Challenger disaster was used for debris characterization.
2. Titan IV/Centaur Launch
   An eastern range, 37 degree azimuth, launch case was chosen in order to investigate the tracking of debris from a typical unmanned flight.
   Simulated radar measurements for a nominal Titan launch provided the basis for event modeling.
   A study for "Titan IV Debris Model", Lockheed Martin report MCR-88-2652 was used for debris characterization.

A simulator was designed to allow rapid prototyping of the event characterization, as well as to smoothly interface with the association algorithms. Flight profiles are utilized for the modeling of powered flight. The profiles may be used until the time of explosion. At that point, the intact vehicle's position and velocity provide the initial parameters for the debris characterization.

FIGS. 8 and 9 depict the debris data of a Shuttle and a Titan explosion. The tables contain the parameters that summarize basic debris characteristics, which were determined to be:

a) Object Type—a main grouping of similar pieces
b) Ballistic Coefficient—this characterizes the effect of atmospheric drag on the debris piece. By definition, the ballistic coefficient is:

$$\beta = W/(C_D \cdot A)$$

Figure 10:
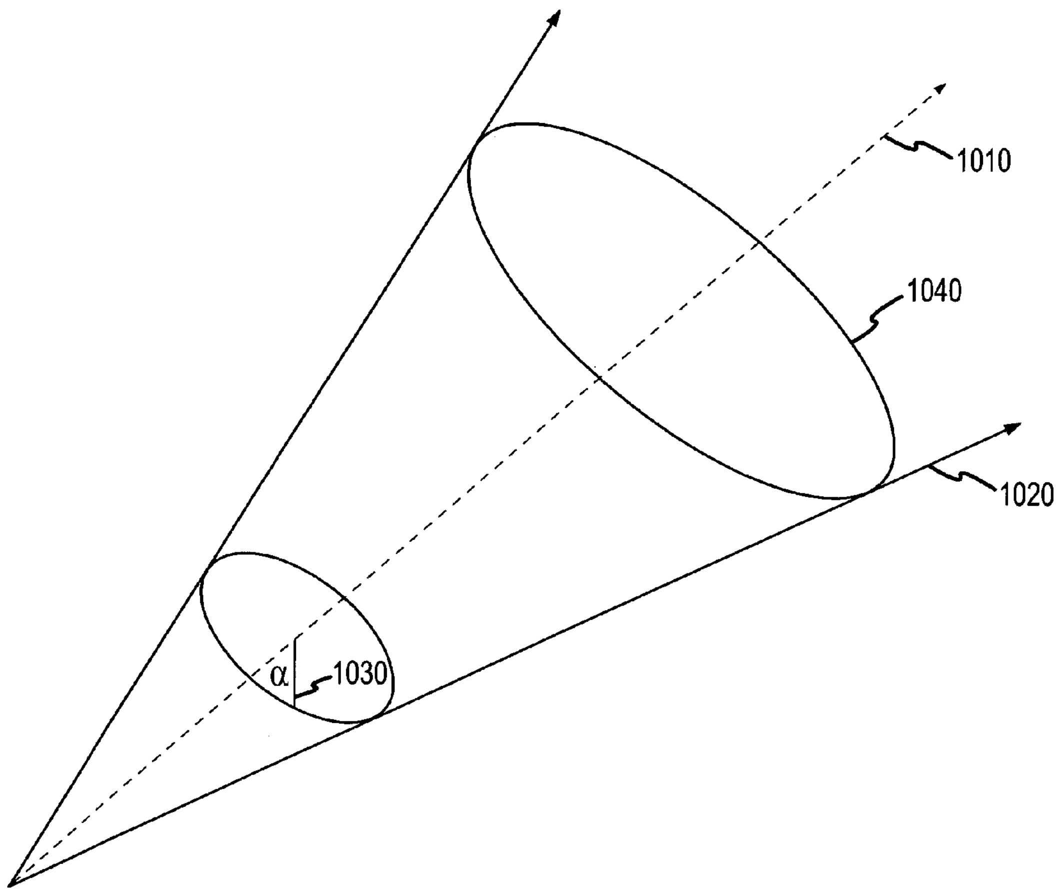
FIG. 10 illustrates the debris velocity model.

$\beta$ is in lb/ft$^2$
W is weight, in lb
$C_D$ is the coefficient of drag, unitless
A is the area, in m$^2$ c) Imparted Delta-V—this is the change (caused by the simulated explosion) to the final pre-explosion velocity vector
d) Alpha—the angle of imparted delta-V, with respect to the final pre-explosion velocity vector FIG. 10 shows the relationship between the pre-explosion velocity vector 1010 and the vector ΔV 1020. Note that the imparted delta-V lies on a cone 1040 of angle $\alpha$ 1030 relative to the pre-explosion velocity vector 1010. The examples randomly generate a unit vector, $\hat{u}$, on that cone. The change imparted to a piece of debris at explosion is a vector, ΔV in the direction of unit vector $\hat{u}$. The initial velocity for a given debris piece is therefore the resultant of ΔV and the pre-explosion vehicle velocity.

Debris trajectories are propagated to impact using $\Delta V$, $\beta$ and the pre-explosion velocity vector from the debris characterization, as well as the position at time of explosion. The following examples apply a second order numerical Ordinary Differential Equation solver to the initial value problem:

$$A(t)=-\mu R(t)/\|R(t)\|^3+D(t)+C_1(t)+C_2(t)$$

A(t) is acceleration in m/sec$^2$ $\mu$ is the Earth gravitational constant in m$^3$/sec$^2$ R(t) is the debris position in m, ECF D(t) is acceleration due to atmospheric drag in m/sec$^2$ $C_1(t)$ is Coriolis acceleration in m/sec$^2$ $C_2(t)$ is Centrifugal acceleration in m/sec$^2$ Acceleration due to atmospheric drag, may be defined:

$$D(t)=-0.5C\beta^{-1}\rho(h)V(t)\|V(t)\|$$

D(t) is in m/sec$^2$

Figure 11:
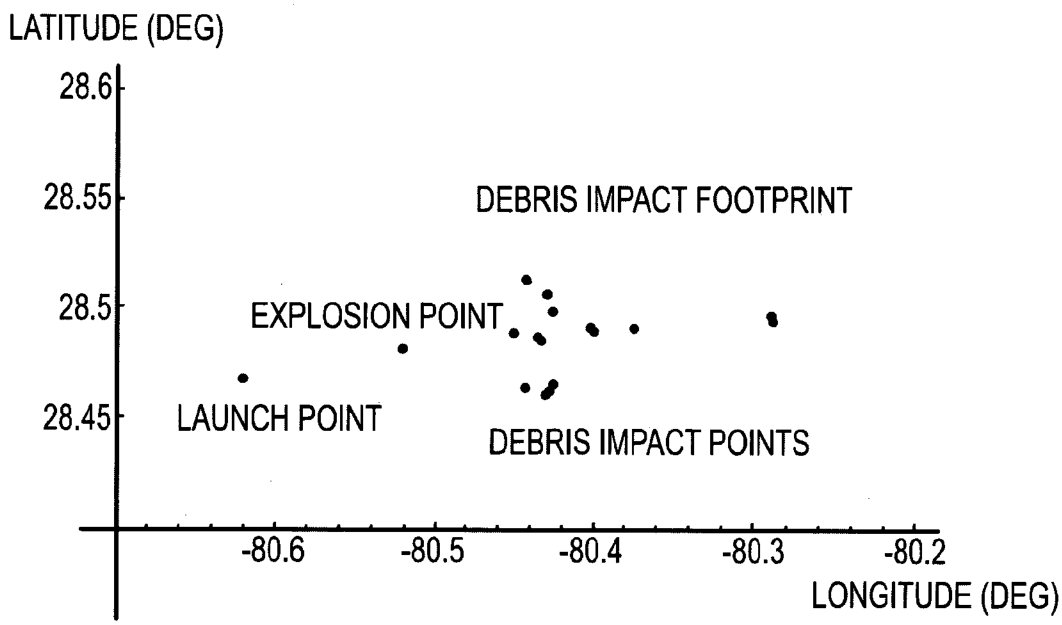
FIG. 11 illustrates Shuttle debris impact points.
Figure 12:
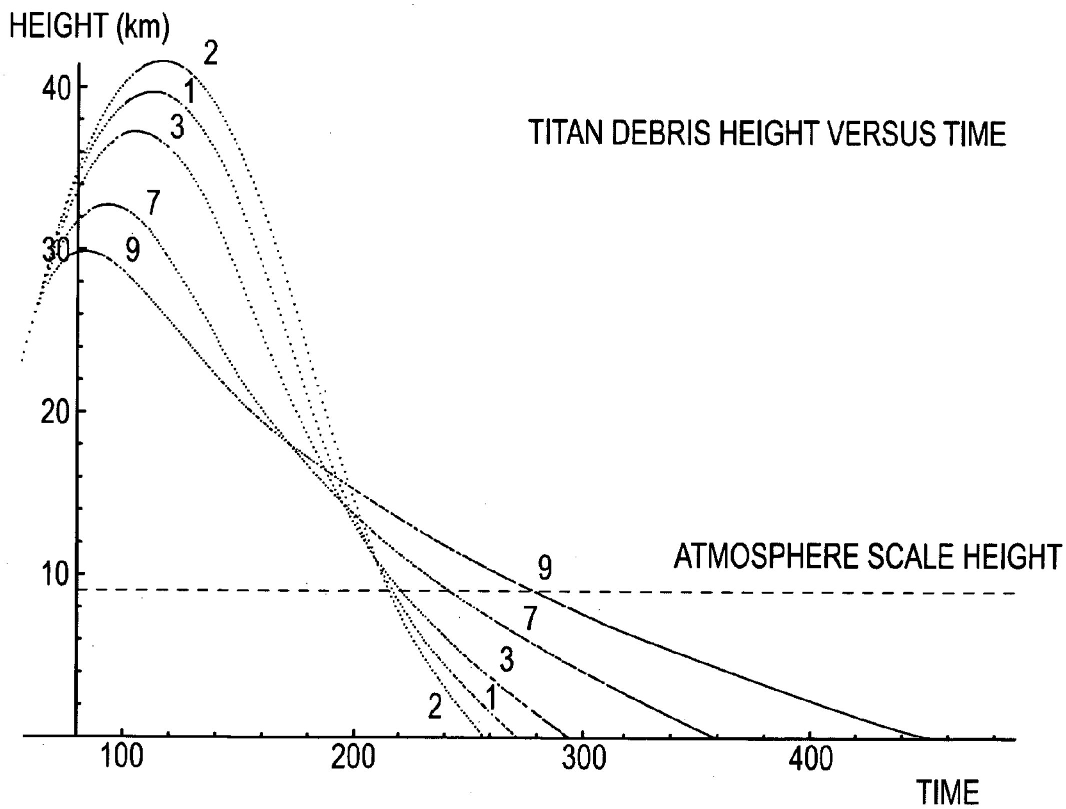
FIG. 12 illustrates a Titan debris height versus time.

C is the units conversion constant $\beta$ is the ballistic coefficient in lb/ft$^2$ $\rho$ (h) is the atmospheric density at altitude h in kg/m$^3$ V(t) is the debris velocity in m/sec, ECF FIGS. 11 and 12 depict typical debris trajectories as created by a simulator with the assumption that there were no interactions between the pieces. FIG. 11 illustrates the footprint of Shuttle debris impact points. The data table accompanying the footprint includes impact distance (great circle) from launch point, in km. FIG. 12 illustrates the heights of the Titan debris pieces in km versus time in seconds.

The examples describe the signal characterization as well as the trajectory. The signal characterization data produced is: the bistatic Doppler shift, and signal-to-noise ratio (SNR).

Figure 13:
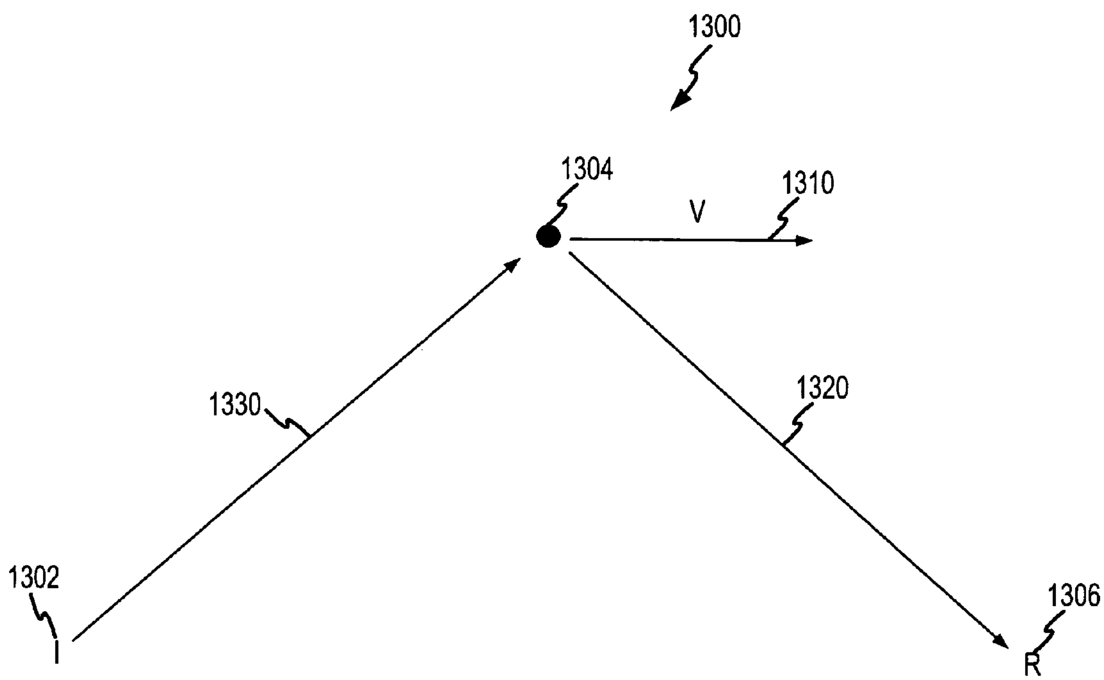
FIG. 13 illustrates the bistatic radar geometry.

FIG. 13 shows the basic geometric configuration 1300. The received signal model may include the effects of Earth occlusion of the signal, beam pattern, and polarization. Earth occlusion of signal determines if the Earth occludes electromagnetic wave propagation between two points. This is used to check for Earth occlusion on either the illuminator-to-target or the target-to-receiver paths. Beam pattern determines the illuminator beam electric field intensity. This modifies the peak power available from an illuminator due to the position of the target in the beam pattern. Polarization determines the power loss due to polarization.

The bistatic Doppler shift is defined as the bistatic range rate scaled by the reciprocal of the wavelength:

$$f_d=(1/\lambda)(V^TA/\|A\|+V^TB/\|B\|)$$

$f_D$ is the bistatic Doppler shift in Hz $\lambda$ is the illuminator wavelength in m V is the velocity vector 1310 of the target 1304 in m/sec, ECF A is the vector 1330 from the target 1304 to the illuminator 1302 in m B is the vector 1320 from the target 1304 to the receiver 1306 in m The power of the target-reflected signal at the receiver input is modeled as follows. The target Signal to Noise Ratio (SNR) is obtained by dividing this by the noise power.

$$P_R=P_TE^2L_P(\lambda/4\pi\|A\|)^2(4\pi\sigma/\lambda^2)(\lambda/4\pi\|B\|)^2G_R$$

Figure 14:
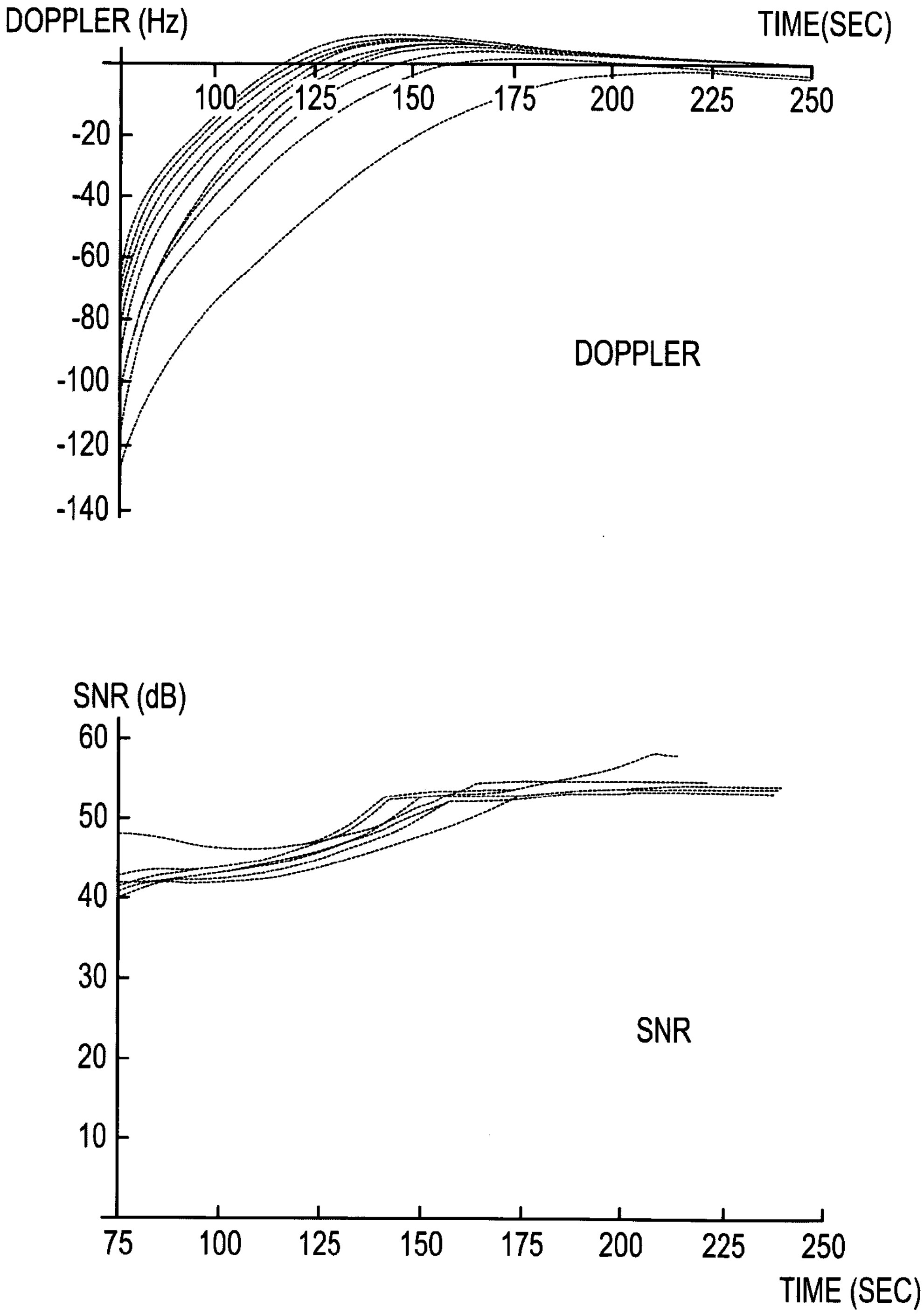
FIG. 14 illustrates signal characterization for shuttle debris and illuminator WEDU.
Figure 15:
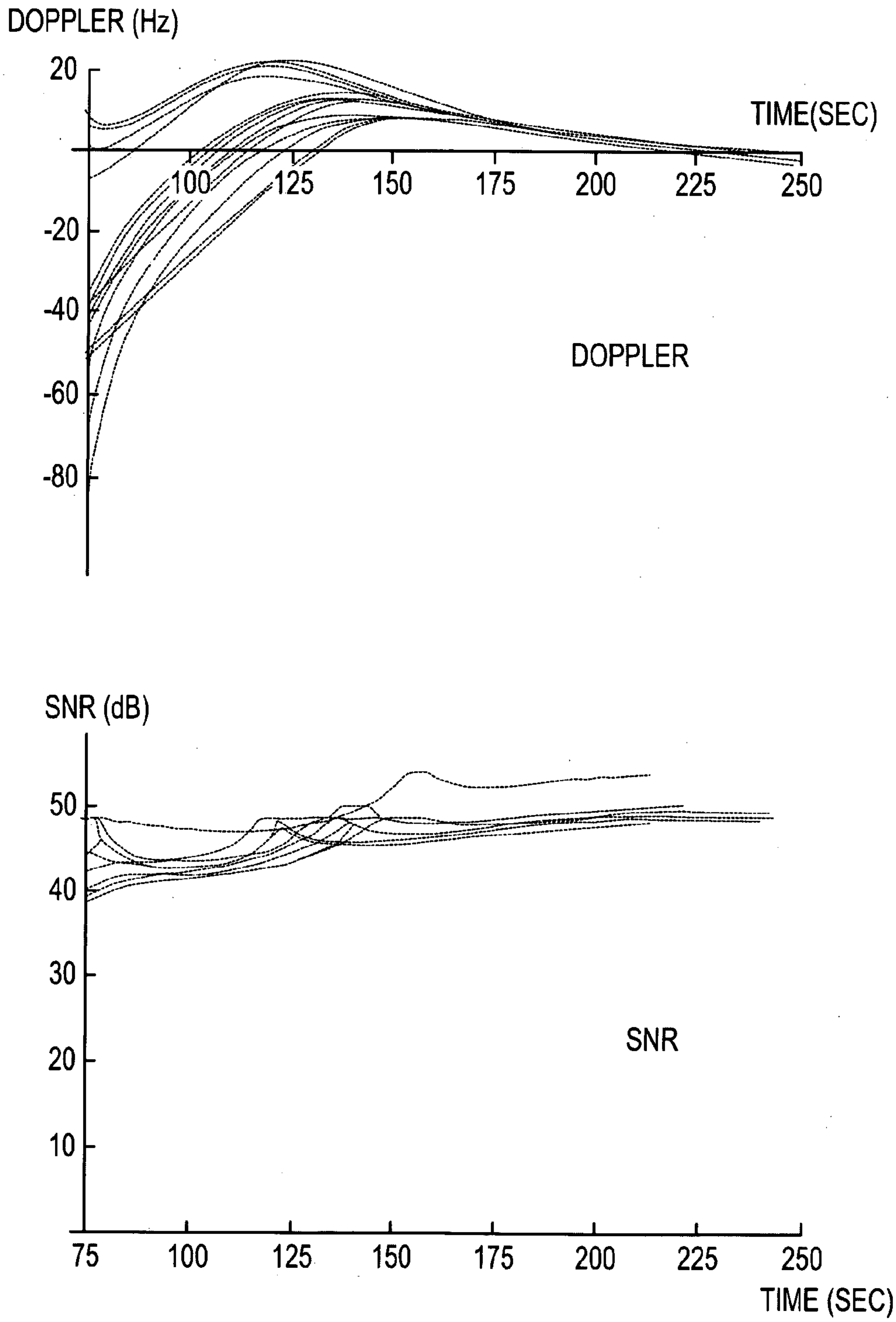
FIG. 15 illustrates signal characterization for shuttle debris and illuminator WTVJ.

$P_R$ is the power of the target-reflected signal at the receiver input, kW $P_T$ is the peak power of the illuminator, kW E is the illuminator beam electric field intensity, unitless $L_P$ is the power loss due to polarization, unitless $\lambda$ is the illuminator wavelength, m $\|A\|$ is the path length from target to illuminator, m $\sigma$ is the target Radar Cross Section (RCS), m$^2$ $\|B\|$ is the path length from target to receiver, m $G_R$ is the receiver antenna gain FIGS. 14 and 15 illustrate representative signal characterization output including bistatic Doppler shift versus time for particular illuminators and debris pieces, and SNR versus time for particular illuminators and debris pieces. In the debris event characterization examples, the simple approximation of optical cross section for RCS is used, providing a good first order approximation for the range of transmitter frequencies considered.

Figure 16:
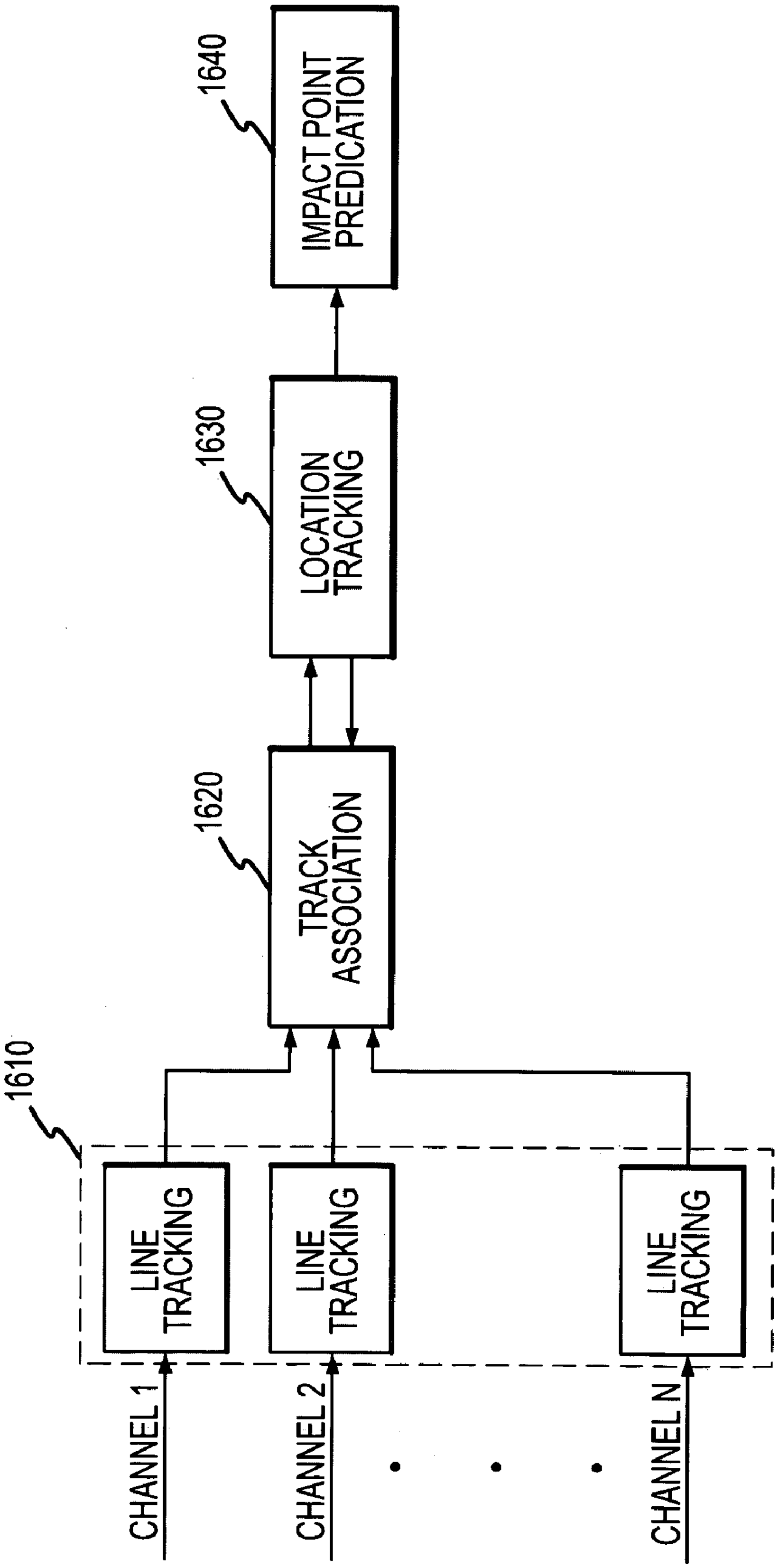
FIG. 16 illustrates a data association and tracking processing flow, according to an embodiment of the present invention.

FIG. 16 shows the processing flow for data association and tracking, according to an embodiment of the present invention. This process estimates the trajectories of each debris object and projects these trajectories to impact, providing an impact estimate and an associated error ellipse for each debris object. Turning specifically to FIG. 16, the processing flow is divided into a line tracking step 1610 for each data channel, a track association step 1620, a position and velocity tracking step 1630, and an impact point prediction step 1640.

In the line tracking step 1610, a data channel may present multiple Doppler tracks (or "lines"), when viewed as a plot of Doppler versus time, some of which are associated with objects, others with signal or data processing artifacts. The function of the line tracker is to track these Doppler "lines" in order to group all detections associated with each distinct object. This function can be viewed as association-in-time.

Turning specifically to the line tracking step 1610, line tracking algorithms, including a Kalman Filter line tracker, have typically been developed and used to track highly maneuverable targets. These algorithms have been adapted for use in the debris tracking problem. In particular, instead of responding to unanticipated maneuvers, the tracker is modified to take advantage of the known dynamics of the debris object. In various applications, the algorithm can be used with several types of measurements, including Doppler, bistatic range, and angle-of-arrival (azimuth and elevation or cone angle).

Following the line tracking step 1610, the track association step 1620 continues the association process by associating the line tracks across all data channels that correspond to common objects. This function can be viewed as association-in-space or, equivalently, association-across-data-channels.

After completing the association process in the two steps above, in which all detections corresponding to each specific object have been identified, the position and velocity tracking step 1630 processes those detections and estimates the trajectory and error covariances over the observation period of each object.

Finally, impact point prediction step 1640, propagates the trajectory and error covariances to the ground, providing estimated impact points and error ellipses for each object.

The algorithm for the correlation of Doppler domain tracks step 1620 from multiple illuminators is intimately related to the position/velocity tracker step 1630. The position/velocity tracker is an extended Kalman filter (EKF), which utilizes a seven-element state vector comprised of position, velocity and the ballistic coefficient.

Two basic problems exist: determining if Doppler domain tracks from multiple illuminators are correlated, and if so initializing the position/velocity tracker for the filtering of this data. Both problems are solved simultaneously as follows. The time and position of the target at the point of the explosion is assumed to be known, but not the velocity of each piece of debris. A Doppler measurement system is well suited to this problem, since Doppler measurements provide little information about position, but excellent information about velocity. In fact, with the initial position of each piece of debris known (approximately), the Doppler equation reduces to a linear equation for the unknown initial velocity.

Assuming that there are at least three illuminators, we may solve for the three components of velocity using any standard technique for solving a system of three linear equations in three unknowns. For example, the orthogonal Householder transformation may be used to reduce the linear system to triangular form, followed by back substitution. The corresponding velocity covariance matrix is obtained from the Doppler measurement noise standard deviations using Cramer Rao Lower Bound (CRLB) theory.

The position/velocity tracker step 1630 is initialized with the known position and estimated velocity for each combination of three Doppler domain tracks. The position/velocity tracker step 1630 produces Doppler residuals that are used to compute a track quality score. For a correct combination of Doppler domain tracks, the Doppler residuals are assumed to be Gaussian with zero mean and the corresponding covariance is computed for the Kalman filter update equation. The sum of squares of normalized Doppler residuals is chi-square distributed and the degrees of freedom is equal to the number of Doppler measurements.

The track quality score is defined as the sum of squares of normalized Doppler residuals, and this score is subsequently normalized to have zero mean and unit variance. If the track quality score exceeds a threshold, such as 10, for example, then the Doppler track combination is incorrect and is eliminated. Otherwise, the Doppler track combinations and the corresponding track quality scores are input to a three dimensional assignment algorithm for the final assignment of correlated tracks and the resolution of conflicting track combinations. In particular, the greedy algorithm is utilized. The greedy algorithm is a sub-optimal assignment algorithm, which assigns the combination with the lowest score, eliminates conflicting combinations and repeats this process until all combinations have been assigned or eliminated.

In order to improve track accuracy, more than three illuminators may be used. In this case, the Doppler tracks for the first three illuminators are correlated as described above. For each additional illuminator, the Doppler tracks are correlated with the position/velocity tracks for each debris piece. For each such combination, a track quality score is computed as described above. The correct combinations are obtained from the two-dimensional greedy algorithm. This approach greatly reduces the number of Doppler track combinations, which must be considered.

The EKF utilized for the position/velocity tracker step 1630 is briefly described as follows. The seven-element state vector is comprised of position and velocity in earth centered fixed (ECF) coordinates, as well as the ballistic coefficient. The dynamics model assumes constant acceleration between measurements. The contributions to the target acceleration included in the model are gravity, atmospheric drag and Coriolis. The Doppler measurements are non-linear with respect to the target position. Therefore, the Doppler measurement equation is linearized and the familiar Kalman filter equations are applied iteratively to the delta state vector and covariance matrix.

Further details for initializing the velocity of each debris piece are as follow. It is assumed that the initial position of each debris piece is known approximately from the pre-explosion track for the target. If three or more illuminators provide Doppler measurements for a debris piece, then the least squares estimator for the velocity is obtained as follows.

Define:

I illuminator position (ECF)

R receiver position (ECF)

T target position (ECF)

V target velocity (ECF)

$u = I - T$ $v = R - T$ $\hat{u} = u/\|u\|$ $\hat{v} = v/\|v\|$

The Doppler equation is:

$$f_d = (-1/\lambda)\partial/\partial t(\|u\| + \|v\|)$$

$$\lambda f_d = (\hat{u}^T + \hat{v}^T)V$$

To combine measurements from m illuminators, define:

$$F = [\lambda_1 f_1 \ldots \lambda_m f_m]^T$$

$$H = \begin{bmatrix} \hat{u}_1^T + \hat{v}_1^T \\ \vdots \\ \hat{u}_m^T + \hat{v}_m^T \end{bmatrix}$$

A weighted least squares solution is desired. That is, each measurement is to be weighted by its standard deviation. Thus, define the matrix:

$$W = \mathrm{diag}(1/\sigma_i)$$

The weighted measurement equation is:

$$WF = WHV + v$$

The random measurement noise v is assumed to be Gaussian with zero mean and unit covariance. An equivalent least squares problem is obtained by multiplying by an orthogonal matrix Q:

$$QWF = QWHV + Qv$$

The matrix Q may be chosen to be the Householder orthogonal transformation, such that:

$$QWH = \begin{bmatrix} \hat{R} \\ 0 \end{bmatrix}$$

where R is upper triangular. Define:

$$QWF = \begin{bmatrix} \hat{f} \\ e \end{bmatrix}$$

$$Qv = \begin{bmatrix} \hat{v} \\ v_e \end{bmatrix}$$

The equivalent least squares problem is:

$$\begin{bmatrix} \hat{f} \\ e \end{bmatrix} = \begin{bmatrix} \hat{R} \\ 0 \end{bmatrix} V + \begin{bmatrix} \hat{v} \\ v_e \end{bmatrix}$$

The least squares estimator for V is also the minimum variance unbiased (MVU) estimator, and is given by:

$$V = R^{-1}$$

The corresponding covariance matrix is obtained from Cramer Rao Lower Bound (CRLB) theory, and is given by:

$$C_V = R^{-1}R^{-T}$$

The tracking algorithm step 1630 estimates the ballistic coefficient in order to assist in discriminating the payload from other debris pieces. A significant source of acceleration for each debris piece is atmospheric drag. In order to include atmospheric drag in the dynamics model, it is necessary to estimate the ballistic coefficient as a component of the state vector. Since the debris pieces have no attitude control, the ballistic coefficient is variable and must be updated with each Doppler measurement. The ballistic coefficient is not directly observable from the Doppler measurements. However, when the EKF state covariance is extrapolated, the ballistic coefficient becomes correlated with the position and velocity components of the state vector. Using the notation introduced in the debris trajectory discussion above, the state vector is extrapolated as follows:

$$R(t+\Delta t) = R(t) + \Delta t V(t) + 0.5\Delta t^2 A(t)$$

$$V(t+\Delta t) = V(t) + \Delta t A(t)$$

$$\beta(t+\Delta t) = \beta(t)$$

In order to extrapolate the EKF state covariance matrix, the state transition matrix must be computed:

$$\Phi = \begin{bmatrix} \partial\tilde{R}/\partial R & \partial\tilde{R}/\partial V & \partial\tilde{R}/\partial\beta \\ \partial\tilde{V}/\partial R & \partial\tilde{V}/\partial V & \partial\tilde{V}/\partial\beta \\ \partial\tilde{\beta}/\partial R & \partial\tilde{\beta}/\partial V & \partial\tilde{\beta}/\partial\beta \end{bmatrix}$$

The partial derivatives of A(t) involve a number of terms. For this purpose, the Coriolis acceleration is ignored and A(t) is approximately:

$$A(t) \approx G(t) + D(t)$$

The acceleration due to gravity is:

$$G = -\mu R/\|R\|^3$$

The acceleration due to atmospheric drag is as follows (h is in km):

$$D = -0.5C\beta^{-1}\rho(h)V\|V\|$$

$$\rho(h) = 1.226\exp(-h/8.4)$$

$$h \approx \|R\| - r_e$$

The partial derivative of the gravity term with respect to position is:

$$\partial G/\partial R = -\mu(\|R\|^{-3}I - 3\|R\|^{-5}RR^T)$$

The partial derivative of the drag term with respect to position is:

$$\partial D/\partial R = -(1/8.4)D\partial h/\partial R = -(1/8.4)D\|R\|^{-1}R^T$$

The partial derivative of the drag term with respect to velocity is:

$$\partial D/\partial V = -0.5C\beta^{-1}\rho(h)(\|V\|I + \|V\|^{-1}VV^T)$$

The partial derivative of the drag term with respect to the ballistic coefficient is:

$$\partial D/\partial\beta = 0.6C\beta^{-2}\rho(h)V\|V\|$$

The partial derivatives comprising the state transition matrix are:

$$\partial R/\partial R = I + 0.5\Delta t^2(\partial G/\partial R + \partial D/\partial R)$$

$$\partial V/\partial R = \Delta t(\partial G/\partial R + \partial D/\partial R)$$

$$\partial\beta = \partial R = 0$$

$$\partial R/\partial V = \Delta t I + 0.5\Delta t^2\partial D/\partial V$$

$$\partial V/\partial V = I + \Delta t\partial D/\partial V$$

$$\partial\beta/\partial V = 0$$

$$\partial R/\partial\beta = 0.5\Delta t^2\partial D/\partial\beta$$

$$\partial V/\partial\beta = \Delta t\partial D/\partial\beta$$

$$\partial\beta/\partial\beta = 1$$

The EKF state covariance matrix is extrapolated as follows:

$$C = \Phi C\Phi^T + Q$$

The process noise covariance matrix Q represents unmodeled changes to the state vector. For position and velocity, the process noise is due to acceleration from wind and it is assumed that the standard deviation is $\sigma_w$. For the ballistic coefficient, the process noise is due to lack of attitude control and it is assumed that the standard deviation is $\sigma_\sigma$. The process noise covariance matrix Q has the structure:

$$Q = \begin{bmatrix} \sigma_w^2 Q_{11} & \sigma_w^2 Q_{21} & 0 \\ \sigma_w^2 Q_{21} & \sigma_w^2 Q_{22} & 0 \\ 0 & 0 & \sigma_\beta^2 \end{bmatrix}$$

$$Q_{11} = 0.25\Delta t^4 I_3$$

$$Q_{22} = \Delta t^2 I_3$$

$$Q_{21} = 0.5\Delta t^3 I_3$$

The ballistic coefficient is not directly observable from the measurements. However, it is possible to estimate the ballistic coefficient because it becomes correlated with other components of the state vector. For example, assume that the EKF state covariance is initialized as a diagonal matrix. After extrapolation:

$$C_{71} = 0.5C_{77}\Delta t^2\partial D_1/\partial\beta \neq 0$$

Similarly, the ballistic coefficient becomes correlated with all components of position and velocity. Consequently, the EKF state vector update will also update the ballistic coefficient.

Returning to FIG. 16, the state and covariance are propagated from the end of the observation period to the Earth's surface in the impact point prediction step 1640. The position and velocity covariance matrix is further transformed to yield 50% probable error ellipses on the surface.

Turning again to the simulated debris event examples, and applying the previously described algorithms to those examples, a destruction event occurs at an arbitrary point in a launch event and fragments of the vehicle are created after the destruction. The fragments are separated from the nominal trajectory by an appropriate vector ΔV and are assigned a ballistic coefficient to match the anticipated behavior of the fragment as atmospheric drag becomes significant. Each of the debris components is propagated forward in time through its flight path until the piece impacts the surface of the earth. The physical data (6 trajectory states versus time for each piece) is operated upon to create a "measurement" file—a time sequence of the received signal Doppler shift and SNR that the PCL receiver would be recording from each of the selected illuminators in the region of interest.

For each of the previously discussed examples, namely, a Titan space lift launch and a Space Shuttle launch, five of the most significant fragments were noted, including the payload for the Titan and the crew cabin for the Shuttle. The measurement files from the examples are submitted to the association and tracking algorithm. The position and velocity tracker operates on the measurement file to provide an estimation of the position, velocity, and ballistic coefficient by using a Kalman filter for each of the possible line track combinations. A score or cost function is generated for each line track combination, representing a measurement of the fit between Doppler measurements and predictions. The track association process using an N-dimensional greedy algorithm selected the proper line track combinations. For each of the correct line track combinations obtained from the track association algorithm, state vectors are estimated and propagated forward in order to establish the target trajectory for as long as measurement updates are provided. After completion of the updates corresponding to the time at which the debris component is either no longer illuminated efficiently or is below the radio horizon with respect to the PCL receiver, the solution is propagated forward without further measurement updates until it impacts the Earth's surface. The time of impact is calculated and the estimated position compared to the actual position. The error is calculated in trajectory local coordinates ("TLC") and resolved into components comprising downrange, crossrange, and altitude at the impact point. The resulting state covariance matrices are used to generate the maximum and minimum error axes in order to calculate the 50% elliptical error probability representing the expected search area for the debris piece.

In the case of the Shuttle example, five Shuttle debris pieces with an explosion event occurring 73 seconds after launch are discussed further. The debris objects consisted of a solid rocket booster, an external fuel tank (EFT) case fragment, the crew cabin, a piece of orbiter debris, and an orbiter wing. Using this set of 5 debris pieces with random vector ΔV induced by the explosion, the Doppler measurements from three illuminators are computed as a function of time. This example, therefore, presents 125 possible line track combinations to the track association algorithm. These 125 possible line track combinations are processed by the track association function using the scores obtained by the position and velocity tracker. The five proper combinations are selected for the Shuttle debris pieces by the greedy association algorithm. Impact points are computed for all five of the debris pieces, and the errors are summarized as a 50% elliptical error probable ("EEP") and the lengths of the corresponding minimum and maximum axes in the table below:

Impact Point Prediction Results for Shuttle Canonical Case

| Object Type | Maximum Axis (km) | Minimum Axis (km) | EEP Area $(km)^2$ |
|---|---|---|---|
| Type 1 Solid Rocket Booster | 1.39 | 1.24 | 5.39 |
| Type 2 EFT Fragment | 1.76 | 1.34 | 7.44 |
| Type 3 Crew Cabin | 1.51 | 1.31 | 6.17 |
| Type 4 Orbiter Debris | 1.73 | 1.34 | 7.25 |
| Type 5 Orbiter Wing | 1.61 | 1.32 | 6.66 |

Figure 17:
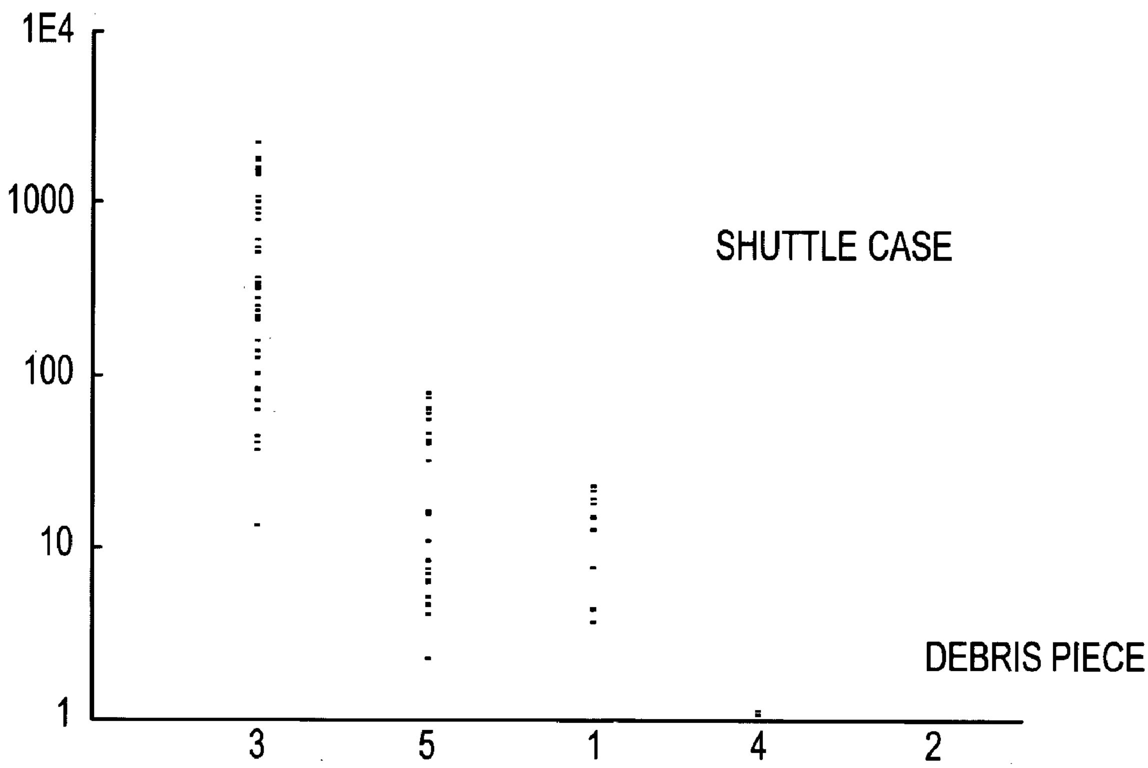
FIG. 17 illustrates a ratio of the scores of mis-associated combinations to the correctly associated combination at each stage of the greedy algorithm for Shuttle.

FIG. 17 depicts the ratio of the scores of all competing incorrect combinations to the correct combination at each stage of the greedy algorithm process. The first column of the figure shows that the first object to be associated by the greedy algorithm was type 3, the crew cabin, and that all competing combinations have scores at least 10 times larger than the correct score. This column shows good discrimination between correct and incorrect combinations. As the greedy algorithm processes successively the other objects, left to right in FIG. 17, the correct associations are made, but the separation of the scores between correct and incorrect combinations decreases in general. Tables 1–5 provide the impact point prediction performance results.

TABLE 1

Impact Point Prediction Performance Results for Shuttle Debris
Solid Rocket Booster
Transmitters used: WTVJ WJXT WSAV
Cost Function After Estimation = 109.965
Impact Time After Explosion (sec) = 141

| Estimated State Vector (Earth Centered Fixed) | | | | | | |
|---|---|---|---|---|---|---|
| | Position (km) | | | Velocity (km/sec) | | Ballistic Coef (lb/ft2) |
| x | y | z | x | y | z | |
| 945.239 | −5521.39 | 3040.56 | −0.017463 | 0.139144 | −0.075624 | 257.786 |
| Actual State Vector (Earth Centered Fixed) | | | | | | |
| | Position | | | Velocity | | Ballistic Coef |

TABLE 1-continued

| Impact Point Prediction Performance Results for Shuttle Debris<br>Solid Rocket Booster<br>Transmitters used: WTVJ WJXT WSAV<br>Cost Function After Estimation = 109.965<br>Impact Time After Explosion (sec) = 141 | | | | | | |
|---|---|---|---|---|---|---|
| | (km) | | | (km/sec) | | (lb/ft2) |
| y | z | x | x | y | z | |
| 945.095 | −5520.91 | 3040.25 | −0.017540 | 0.145848 | −0.079414 | 300.000 |
| State Vector Error (Trajectory Local Coordinates) | | | | | | |
| | Position (km) | | | Velocity (km/sec) | | Ballistic Coef (lb/ft2) |
| Downrange | Crossrange | Altitude | Downrange | Crossrange | Altitude | |
| −0.06821 | −0.03564 | −0.41954 | 0.00156791 | −0.00012963 | −0.0096326 | 42.214 |
| State Vector Uncertainties, 1-sigma (Trajectory Local Coordinates) | | | | | | |
| | Position (km) | | | Velocity (km/sec) | | Ballistic Coef (lb/ft2) |
| Downrange | Crossrange | Altitude | Downrange | Crossrange | Altitude | |
| 1.07851 | 1.15064 | 1.30660 | 0.011023 | 0.003903 | 0.021845 | 8.30099 |

| Search Area Projected onto Earth Surface | | |
|---|---|---|
| Maximum Axis (km) | Minimum Axis (km) | Elliptical Search Area (EEP) $(km)^2$ |
| 1.38738 | 1.23768 | 5.39450 |

TABLE 2

| Impact Point Prediction Performance Results for Shuttle Debris<br>External Fuel Tank Fragment<br>Transmitters used: WTVJ WJXT WSAV<br>Cost Function After Estimation = 151.706<br>Impact Time After Explosion (sec) = 170 | | | | | | |
|---|---|---|---|---|---|---|
| Estimated State Vector (Earth Centered Fixed) | | | | | | |
| | Position (km) | | | Velocity (km/sec) | | Ballistic Coef (lb/ft2) |
| x | y | z | x | y | z | |
| 930.085 | −5522.63 | 3040.20 | −0.014866 | 0.087043 | −0.048018 | 131.992 |
| Actual State Vector (Earth Centered Fixed) | | | | | | |
| | Position (km) | | | Velocity (km/sec) | | Ballistic Coef (lb/ft2) |
| y | z | x | x | y | z | |
| 929.415 | −5523.56 | 3040.45 | −0.013052 | 0.078288 | −0.043231 | 100.000 |
| State Vector Error (Trajectory Local Coordinates) | | | | | | |
| | Position (km) | | | Velocity (km/sec) | | Ballistic Coef (lb/ft2) |
| Downrange | Crossrange | Altitude | Downrange | Crossrange | Altitude | |
| −0.081341 | −0.16995 | −0.91498 | 0.00033790 | −0.00005317 | −0.0096341 | −31.992 |
| State Vector Uncertainties, 1-sigma (Trajectory Local Coordinates) | | | | | | |
| | Position (km) | | | Velocity (km/sec) | | Ballistic Coef (lb/ft2) |
| Downrange | Crossrange | Altitude | Downrange | Crossrange | Altitude | |

TABLE 2-continued

| Impact Point Prediction Performance Results for Shuttle Debris<br>External Fuel Tank Fragment<br>Transmitters used: WTVJ WJXT WSAV<br>Cost Function After Estimation = 151.706<br>Impact Time After Explosion (sec) = 170 | | | | | | |
|---|---|---|---|---|---|---|
| 1.49103 | 1.14574 | 3.64666 | 0.009232 | 0.003424 | 0.071959 | 8.36213 |

| Search Area Projected onto Earth Surface | | |
|---|---|---|
| Maximum Axis (km) | Minimum Axis (km) | Elliptical Search Area (EEP) $(km)^2$ |
| 1.76364 | 1.34258 | 7.43878 |

TABLE 3

| Impact Point Prediction Performance Results for Shuttle Debris<br>Crew Cabin<br>Transmitters used: WTVJ WJXT WSAV<br>Cost Function After Estimation = 1.745<br>Impact Time After Explosion (sec) = 140 | | | | | | |
|---|---|---|---|---|---|---|
| Estimated State Vector (Earth Centered Fixed) | | | | | | |
| Position (km) | | | Velocity (km/sec) | | | Ballistic Coef (lb/ft2) |
| x | y | z | x | y | z | |
| 037.145 | −5522.67 | 3039.84 | −0.018275 | 0.116179 | −0.063764 | 203.580 |
| Actual State Vector (Earth Centered Fixed) | | | | | | |
| Position (km) | | | Velocity (km/sec) | | | Ballistic Coef (lb/ft2) |
| y | z | x | x | y | z | |
| 936.747 | −5522.71 | 3039.79 | −0.017955 | 0.114636 | −0.063092 | 200.000 |
| State Vector Error (Trajectory Local Coordinates) | | | | | | |
| Position (km) | | | Velocity (km/sec) | | | Ballistic Coef (lb/ft2) |
| Downrange | Crossrange | Altitude | Downrange | Crossrange | Altitude | |
| −0.40087 | −0.03744 | −0.08550 | 0.00016806 | −0.00015393 | −0.0005185 | −3.580 |
| State Vector Uncertainties, 1-sigma (Trajectory Local Coordinates) | | | | | | |
| Position (km) | | | Velocity (km/sec) | | | Ballistic Coef (lb/ft2) |
| Downrange | Crossrange | Altitude | Downrange | Crossrange | Altitude | |
| 1.26081 | 1.13278 | 1.51463 | 0.011804 | 0.003797 | 0.038867 | 8.30099 |

| Search Area Projected onto Earth Surface | | |
|---|---|---|
| Maximum Axis (km) | Minimum Axis (km) | Elliptical Search Area (EEP) $(km)^2$ |
| 1.50511 | 1.30590 | 6.17487 |

TABLE 4

Impact Point Prediction Performance Results for Shuttle Debris
Orbiter Debris
Transmitters used: WTVJ WJXT WSAV
Cost Function After Estimation = 160.810
Impact Time After Explosion (sec) = 163

Estimated State Vector (Earth Centered Fixed)

| Position (km) | | | Velocity (km/sec) | | | Ballistic Coef (lb/ft2) |
|---|---|---|---|---|---|---|
| x | y | z | x | y | z | |
| 931.861 | −5522.97 | 3039.03 | −0.014857 | 0.086613 | −0.047750 | 130.185 |

Actual State Vector (Earth Centered Fixed)

| Position (km) | | | Velocity (km/sec) | | | Ballistic Coef (lb/ft2) |
|---|---|---|---|---|---|---|
| y | z | x | x | y | z | |
| 931.170 | −5523.87 | 3039.35 | −0.013075 | 0.078296 | −0.043218 | 100.000 |

State Vector Error (Trajectory Local Coordinates)

| Position (km) | | | Velocity (km/sec) | | | Ballistic Coef (lb/ft2) |
|---|---|---|---|---|---|---|
| Downrange | Crossrange | Altitude | Downrange | Crossrange | Altitude | |
| −0.83107 | −0.10073 | −0.92180 | 0.00037709 | −0.00006612 | −0.0091275 | −30.185 |

State Vector Uncertainties, 1-sigma (Trajectory Local Coordinates)

| Position (km) | | | Velocity (km/sec) | | | Ballistic Coef (lb/ft2) |
|---|---|---|---|---|---|---|
| Downrange | Crossrange | Altitude | Downrange | Crossrange | Altitude | |
| 1.45540 | 1.14491 | 3.18431 | 0.009910 | 0.003463 | 0.061594 | 7.13202 |

Search Area Projected onto Earth Surface

| Maximum Axis (km) | Minimum Axis (km) | Elliptical Search Area (EEP) $(km)^2$ |
|---|---|---|
| 1.72716 | 1.33534 | 7.24561 |

TABLE 5

Impact Point Prediction Performance Results for Shuttle Debris
Orbiter Wing
Transmitters used: WTVJ WJXT WSAV
Cost Function After Estimation = 29.813
Impact Time After Explosion (sec) = 149

Estimated State Vector (Earth Centered Fixed)

| Position (km) | | | Velocity (km/sec) | | | Ballistic Coef (lb/ft2) |
|---|---|---|---|---|---|---|
| x | y | z | x | y | z | |
| 934.659 | −5522.54 | 3039.57 | −0.017003 | 0.101495 | −0.055888 | 170.411 |

Actual State Vector (Earth Centered Fixed)

| Position (km) | | | Velocity (km/sec) | | | Ballistic Coef (lb/ft2) |
|---|---|---|---|---|---|---|
| y | z | x | x | y | z | |
| 934.108 | −5523.08 | 3039.74 | −0.016005 | 0.096961 | −0.053495 | 150.000 |

TABLE 5-continued

Impact Point Prediction Performance Results for Shuttle Debris
Orbiter Wing
Transmitters used: WTVJ WJXT WSAV
Cost Function After Estimation = 29.813
Impact Time After Explosion (sec) = 149

State Vector Error (Trajectory Local Coordinates)

| Position (km) | | | Velocity (km/sec) | | | Ballistic Coef (lb/ft2) |
|---|---|---|---|---|---|---|
| Downrange | Crossrange | Altitude | Downrange | Crossrange | Altitude | |
| −0.63429 | −0.06500 | −0.58661 | 0.00025201 | −0.00010595 | −0.0044563 | −20.411 |

State Vector Uncertainties, 1-sigma (Trajectory Local Coordinates)

| Position (km) | | | Velocity (km/sec) | | | Ballistic Coef (lb/ft2) |
|---|---|---|---|---|---|---|
| Downrange | Crossrange | Altitude | Downrange | Crossrange | Altitude | |
| 1.35199 | 1.13696 | 2.03099 | 0.011016 | 0.003659 | 0.047956 | 8.69097 |

Search Area Projected onto Earth Surface

| Maximum Axis (km) | Minimum Axis (km) | Elliptical Search Area (EEP) $(km)^2$ |
|---|---|---|
| 1.60545 | 1.32076 | 6.66149 |

Turning to the Titan example, five Titan debris pieces are simulated with an explosion event occurring 74 seconds after launch. The debris objects consist of a solid rocket motor (SRM) case, a TVC injectant tank, the payload, an aft oxygen tank, and a longeron tie. These objects are representative of the major classes of debris pieces from a Titan explosion. Using this set of five debris pieces with random vector ΔV caused by the explosion, the Doppler measurements from three transmitters are computed and the association algorithm operates upon the resultant 125 line track combinations.

Figure 18:
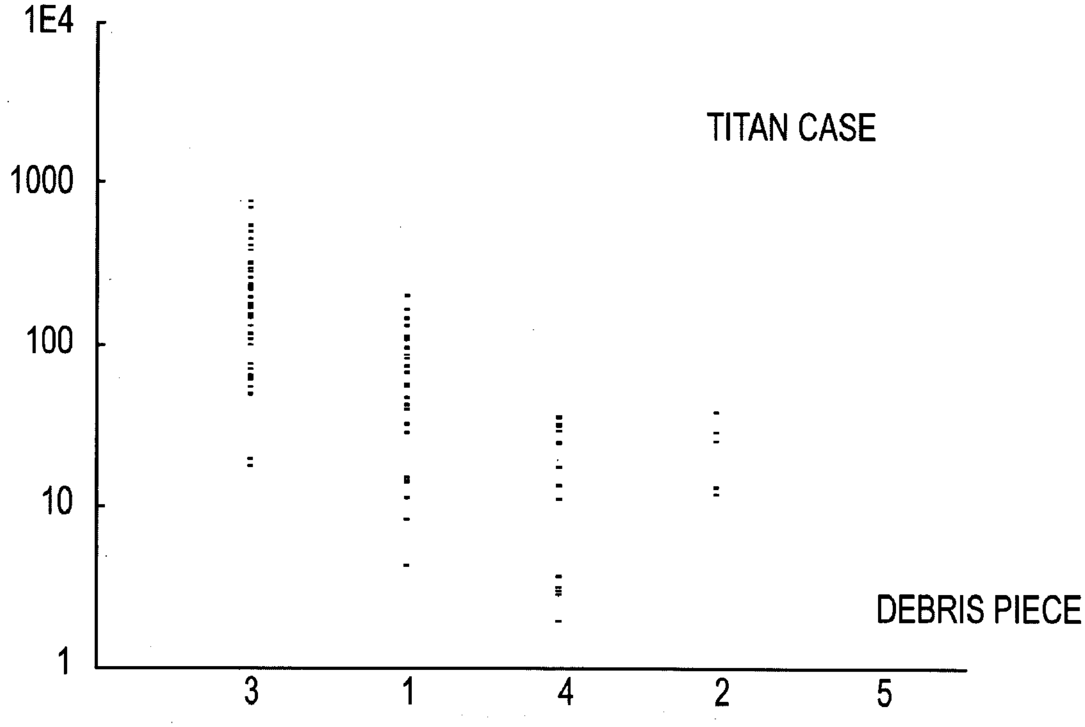
FIG. 18 illustrates a ratio of the scores of mis-associated combinations to the correctly associated combination at each stage of the greedy algorithm for Titan.

In the same manner as in the Shuttle case, the track association algorithm evaluates the scores for these 125 line track combinations. FIG. 18 depicts the ratio of the scores of the incorrect combinations normalized to the correct combinations at each stage of the greedy algorithm process. The performance here is similar to that in the Shuttle case above. The first object processed by the greedy algorithm is the payload (type 3), and the normalized scores for all incorrect combinations (column 1 in FIG. 18) are at least 10 times larger than that for the correct combination. Again, as successive objects are processed (left to right in FIG. 18), the separation in scores diminishes, indicating less ability to discriminate correct track combinations. Impact points, the 50% elliptical error probable (EEP) and corresponding minimum and maximum axes for the five Titan debris fragments are tabulated below. Tables 6–10 provide the impact point prediction performance results.

Impact Point Prediction Results for Titan Canonical Case

| | Object Type | Maximum Axis (km) | Minimum Axis (km) | EEP Area $(km)^2$ |
|---|---|---|---|---|
| Type 1 | SRM Case | 1.56 | 1.30 | 6.38 |
| Type 2 | TVC Injectant Tank | 1.53 | 1.24 | 5.96 |
| Type 3 | Payload | 1.71 | 1.38 | 7.43 |
| Type 4 | Aft Oxygen Tank | 2.15 | 1.48 | 10.03 |
| Type 5 | Longeron Tie | 3.38 | 1.63 | 17.32 |

TABLE 6

Impact Point Prediction Performance Results for Titan Debris
Solid Rocket Motor Case
Transmitters used: WTVJ WJXT WSAV
Cost Function After Estimation = 30.836
Impact Time After Explosion (sec) = 211

Estimated State Vector (Earth Centered Fixed)

| Position (km) | Velocity (km/sec) | Ballistic Coef (lb/ft2) |
|---|---|---|

TABLE 6-continued

Impact Point Prediction Performance Results for Titan Debris
Solid Rocket Motor Case
Transmitters used: WTVJ WJXT WSAV
Cost Function After Estimation = 30.836
Impact Time After Explosion (sec) = 211

| x | y | z | x | y | z | |
|---|---|---|---|---|---|---|
| 961.155 | −5499.87 | 3074.44 | −0.017038 | 0.101332 | −0.056529 | 149.366 |

Actual State Vector (Earth Centered Fixed)

| Position (km) | | | Velocity (km/sec) | | | Ballistic Coef (lb/ft2) |
|---|---|---|---|---|---|---|
| y | z | x | x | y | z | |
| 960.836 | −5499.52 | 3074.13 | −0.017261 | 0.102423 | −0.057354 | 163.000 |

State Vector Error (Trajectory Local Coordinates)

| Position (km) | | | Velocity (km/sec) | | | Ballistic Coef (lb/ft2) |
|---|---|---|---|---|---|---|
| Downrange | Crossrange | Altitude | Downrange | Crossrange | Altitude | |
| −0.25261 | −0.08448 | −0.50179 | 0.00002993 | −0.00018530 | −0.0013725 | 13.634 |

State Vector Uncertainties, 1-sigma (Trajectory Local Coordinates)

| Position (km) | | | Velocity (km/sec) | | | Ballistic Coef (lb/ft2) |
|---|---|---|---|---|---|---|
| Downrange | Crossrange | Altitude | Downrange | Crossrange | Altitude | |
| 1.21032 | 1.23337 | 2.04330 | 0.008535 | 0.003250 | 0.039690 | 4.74598 |

Search Area Projected onto Earth Surface

| Maximum Axis (km) | Minimum Axis (km) | Elliptical Search Area (EEP) $(km)^2$ |
|---|---|---|
| 1.56363 | 1.29840 | 6.37811 |

TABLE 7

Impact Point Prediction Performance Results for Titan Debris
TVC Injectant Tank
Transmitters used: WTVJ WJXT WSAV
Cost Function After Estimation = 155.536
Impact Time After Explosion (sec) = 197

Estimated State Vector (Earth Centered Fixed)

| Position (km) | | | Velocity (km/sec) | | | Ballistic Coef (lb/ft2) |
|---|---|---|---|---|---|---|
| x | y | z | x | y | z | |
| 968.031 | −5499.06 | 3075.36 | −0.017863 | 0.123545 | −0.068398 | 189.152 |

Actual State Vector (Earth Centered Fixed)

| Position (km) | | | Velocity (km/sec) | | | Ballistic Coef (lb/ft2) |
|---|---|---|---|---|---|---|
| y | z | x | x | y | z | |
| 967.730 | −5497.92 | 3074.62 | −0.018655 | 0.130320 | −0.072370 | 248.000 |

State Vector Error (Trajectory Local Coordinates)

| Position (km) | | | Velocity (km/sec) | | | Ballistic Coef (lb/ft2) |
|---|---|---|---|---|---|---|

TABLE 7-continued

Impact Point Prediction Performance Results for Titan Debris
TVC Injectant Tank
Transmitters used: WTVJ WJXT WSAV
Cost Function After Estimation = 155.536
Impact Time After Explosion (sec) = 197

| Downrange | Crossrange | Altitude | Downrange | Crossrange | Altitude | |
|---|---|---|---|---|---|---|
| −0.09911 | −0.08099 | −1.37755 | 0.00396623 | −0.00019004 | −0.0078804 | 58.848 |

State Vector Uncertainties, 1-sigma (Trajectory Local Coordinates)

| Position (km) | | | Velocity (km/sec) | | | Ballistic Coef (lb/ft2) |
|---|---|---|---|---|---|---|
| Downrange | Crossrange | Altitude | Downrange | Crossrange | Altitude | |
| 1.13206 | 1.23203 | 1.53208 | 0.009426 | 0.003433 | 0.031074 | 5.45419 |

Search Area Projected onto Earth Surface

| Maximum Axis (km) | Minimum Axis (km) | Elliptical Search Area (EEP) $(km)^2$ |
|---|---|---|
| 1.52567 | 1.24249 | 5.95529 |

TABLE 8

Impact Point Prediction Performance Results for Titan Debris
Payload
Transmitters used: WTVJ WJXT WSAV
Cost Function After Estimation = 7.350
Impact Time After Explosion (sec) = 234

Estimated State Vector (Earth Centered Fixed)

| Position (km) | | | Velocity (km/sec) | | | Ballistic Coef (lb/ft2) |
|---|---|---|---|---|---|---|
| x | y | z | x | y | z | |
| 953.066 | −5501.01 | 3073.41 | −0.013539 | 0.078526 | −0.043885 | 102.644 |

Actual State Vector (Earth Centered Fixed)

| Position (km) | | | Velocity (km/sec) | | | Ballistic Coef (lb/ft2) |
|---|---|---|---|---|---|---|
| y | z | x | x | y | z | |
| 952.461 | −5501.32 | 3073.44 | −0.013457 | 0.78435 | −0.043959 | 100.000 |

State Vector Error (Trajectory Local Coordinates)

| Position (km) | | | Velocity (km/sec) | | | Ballistic Coef (lb/ft2) |
|---|---|---|---|---|---|---|
| Downrange | Crossrange | Altitude | Downrange | Crossrange | Altitude | |
| −0.64885 | −0.07306 | 0.19057 | 0.00006679 | −0.00011471 | −0.0000554 | −2.644 |

State Vector Uncertainties, 1-sigma (Trajectory Local Coordinates)

| Position (km) | | | Velocity (km/sec) | | | Ballistic Coef (lb/ft2) |
|---|---|---|---|---|---|---|
| Downrange | Crossrange | Altitude | Downrange | Crossrange | Altitude | |
| 1.39915 | 1.23951 | 3.61867 | 0.007505 | 0.003019 | 0.053130 | 3.46430 |

TABLE 8-continued

| Impact Point Prediction Performance Results for Titan Debris<br>Payload<br>Transmitters used: WTVJ WJXT WSAV<br>Cost Function After Estimation = 7.350<br>Impact Time After Explosion (sec) = 234 | | |
|---|---|---|
| Search Area Projected onto Earth Surface | | |
| Maximum Axis (km) | Minimum Axis (km) | Elliptical Search Area (EEP) $(km)^2$ |
| 1.71180 | 1.38204 | 7.43228 |

TABLE 9

Impact Point Prediction Performance Results for Titan Debris
Aft Oxygen Tank
Transmitters used: WTVJ WJXT WSAV
Cost Function After Estimation = 123.959
Impact Time After Explosion (sec) = 302

| Estimated State Vector (Earth Centered Fixed) | | | | | | |
|---|---|---|---|---|---|---|
| | Position (km) | | | Velocity (km/sec) | | Ballistic Coef (lb/ft2) |
| x | y | z | x | y | z | |
| 940.555 | −5504.22 | 3072.55 | −0.008040 | 0.047393 | −0.026451 | 36.009 |
| **Actual State Vector (Earth Centered Fixed)** | | | | | | |
| | Position (km) | | | Velocity (km/sec) | | Ballistic Coef (lb/ft2) |
| y | z | x | x | y | z | |
| 939.992 | −5504.07 | 3072.26 | −0.008275 | 0.048704 | −0.027276 | 40.000 |
| **State Vector Error (Trajectory Local Coordinates)** | | | | | | |
| | Position (km) | | | Velocity (km/sec) | | Ballistic Coef (lb/ft2) |
| Downrange | Crossrange | Altitude | Downrange | Crossrange | Altitude | |
| −0.52821 | −0.14231−0352665 | | 0.00000959 | −0.00008079 | −0.0015652 | 3.991 |
| **State Vector Uncertainties, 1-sigma (Trajectory Local Coordinates)** | | | | | | |
| | Position (km) | | | Velocity (km/sec) | | Ballistic Coef (lb/ft2) |
| Downrange | Crossrange | Altitude | Downrange | Crossrange | Altitude | |
| 1.82512 | 1.27116 | 10.12522 | 0.006214 | 0.002547 | 0.087585 | 1.25987 |

| Search Area Projected onto Earth Surface | | |
|---|---|---|
| Maximum Axis (km) | Minimum Axis (km) | Elliptical Search Area (EEP) $(km)^2$ |
| 2.15242 | 1.48292 | 10.02760 |

TABLE 10

Impact Point Prediction Performance Results for Titan Debris
Aft Longeron Tie
Transmitters used: WTVJ WJXT WSAV
Cost Function After Estimation = 274/938
Impact Time After Explosion (sec) = 392

| | | | | | | |
|---|---|---|---|---|---|---|
| Estimated State Vector (Earth Centered Fixed) | | | | | | |
| Position (km) | | | Velocity (km/sec) | | | Ballistic Coef (lb/ft2) |
| x | y | z | x | y | z | |
| 934.574 | −5507.93 | 3073.27 | −0.005091 | 0.030395 | −0.016935 | 10.656 |
| Actual State Vector (Earth Centered Fixed) | | | | | | |
| Position (km) | | | Velocity (km/sec) | | | Ballistic Coef (lb/ft2) |
| y | z | x | x | y | z | |
| 934.053 | −5505.41 | 3071.65 | −0.005643 | 0.033376 | −0.018684 | 19.000 |
| State Vector Error (Trajectory Local Coordinates) | | | | | | |
| Position (km) | | | Velocity (km/sec) | | | Ballistic Coef (lb/ft2) |
| Downrange | Crossrange | Altitude | Downrange | Crossrange | Altitude | |
| −0.09070 | −0.17413 | −3.03046 | 0.00004502 | −0.00007195 | −0.0034988 | 8.344 |
| State Vector Uncertainties, 1-sigma (Trajectory Local Coordinates) | | | | | | |
| Position (km) | | | Velocity (km/sec) | | | Ballistic Coef (lb/ft2) |
| Downrange | Crossrange | Altitude | Downrange | Crossrange | Altitude | |
| 2.87413 | 1.4222 | 16.90742 | 0.006985 | 0.002485 | 0.101368 | 0.29939 |

| Search Area Projected onto Earth Surface | | |
|---|---|---|
| Maximum Axis (km) | Minimum Axis (km) | Elliptical Search Area (EEP) $(km)^2$ |
| 3.37552 | 1.63290 | 17.31610 |

In summary, the PCL solution for debris tracking is a viable means for accurate and low-cost detection, tracking, identification, and impact point prediction for debris originating from a target vehicle, such as a Space Shuttle or space lift launch. It will be apparent to those skilled in the art that various modifications and variations can be made in the present invention without departing from the spirit or scope of the invention. Thus, it is intended that the present invention cover the modifications and variations of this invention provided that they come within the scope of any claims and their equivalents.

What is claimed is:

1. A bistatic radar system for tracking debris using commercial broadcast signals, the bistatic radar system comprising:

at least one PCL processing unit to receive target reflected signals and direct signals from multiple illuminators broadcasting signals, the at least one PCL processing unit including a digital processing element to implement algorithms to determine tracking parameters using the Doppler shifts of the reflected signals and correlating tracks for the debris associated with each of the illuminators; and a display element to indicate a location of the debris pieces.

2. A bistatic radar system for tracking debris using commercial broadcast signals, the bistatic radar system comprising:

at least one PCL processing unit to receive target reflected signals and direct signals from illuminators broadcasting signals, the at least one PCL processing unit including a digital processing element to implement algorithms to determine tracking parameters using the Doppler shifts of the reflected sianals and correlating tracks for the debris;

a display element to indicate a location of the debris pieces; and a remote frequency referencing system.

3. A bistatic passive radar system for tracking debris comprising:

an array of antennas to receive direct signals transmitted from at least three illuminators and reflected signals reflected by a target, wherein the reflected signals are transmitted from the at least three illuminators and reflected from the debris;

a plurality of receivers coupled to the array of antennas to receive the signals from the array of antennas;

a digital processing element to receive and digitize the direct and reflected signals from the receivers, to extract measured parameters from the digitized direct and reflected signals, and to compute trajectories and projected impact points of the debris using the measured parameters; and a display element to display information from the digital processing element.

4. The bistatic passive radar system of claim 3, wherein the array of antennas includes short-range tracking antennas.

5. The bistatic passive radar system of claim 3, wherein the array of antennas includes long-range tracking antennas.

6. The bistatic passive radar system of claim 3, wherein the array of antennas includes reference antennas.

7. The bistatic passive radar system of claim 3, wherein the plurality of receivers includes at least one narrowband receiver.

8. The bistatic passive radar system of claim 3, wherein the plurality of receivers includes at least one wideband receiver.

9. The bistatic passive radar system of claim 3, wherein the plurality of receivers includes at least one reference receiver.

10. A method for validating a bistatic radar system prior to a scheduled launch event comprising the steps of:

optimizing a transmitter constellation;

predicting a short-range/long-range handover for antennas with the system; and verifying operation of transmitter signals to the antennas.

11. The method of claim 10 further comprising the step of remote frequency referencing system polling.

12. A method for tracking a piece of debris from a launched vehicle, the method comprising the steps of:

computing a bistatic Doppler shift for each received signal reflected by the piece of debris using the reflected signal and a direct signal from one or more illuminators;

computing a signal-to-noise ratio for each of the reflected signals; and determining a track for the piece of debris using the bistatic Doppler shift.

13. A method for tracking a piece of airborne debris, wherein the debris reflects commercial broadcast signals, the method comprising the steps of:

receiving the reflected signals at an antenna array;

receiving direct reference signals from one or more illuminators at the antenna array;

digitizing the signals from the antenna array;

processing the signals to remove interference, including mitigating co-channel interference;

generating an ambiguity surface by comparing data from the processed received signals with a set of possible target measurements;

determining detections with the ambiguity surface;

determining a Doppler shift for the detections by comparing the reflected signals with the direct reference signals;

assigning the detections to line tracks;

associating the line tracks with the piece of debris; and estimating a trajectory for the piece of debris using a Doppler shift function.

14. The method of claim 13, further comprising the step of estimating an error ellipse for a recovery site of the piece of debris.

15. The method of claim 14, wherein the step of estimating an error ellipse for a recovery site further comprises calculating a fifty-percent error ellipse.

16. The method of claim 13, wherein the step of determining a Doppler shift for the detections further comprises determining a Doppler shift from narrowband Doppler measurements.

17. The method of claim 13, wherein the step of determining a Doppler shift for the detections further comprises determining a Doppler shift from wideband Doppler and time delay measurements.

18. A method for tracking a piece of debris detected using a bistatic radar system that receives direct and reflected commercial broadcast signals, the method comprising the steps of:

determining a Doppler shift from the reflected signals and the direct signals;

assigning a detection correlating to the piece of debris to a Doppler line track;

associating the line track to the piece of debris;

estimating a trajectory for the piece of debris using measurements comprising the Doppler shift; and predicting an impact point for the piece of debris according to the measurements.

19. A method for tracking a plurality of debris pieces, the method comprising the steps of:

determining a Doppler shift for each of the plurality of debris pieces using reflected signals and direct signals;

assigning a line track for each of the plurality of debris pieces from the reflected signals;

associating the line tracks to each of the plurality of debris pieces;

estimating a trajectory for the plurality of debris pieces using Doppler shift measurements from the line tracks; and tracking the plurality of debris pieces according to the Doppler shift measurements.

20. A method for using a bistatic radar system for tracking debris, comprising the steps of:

processing a pre-launch calibration and checkout function;

processing a post-launch pre-destruct function that monitors status of the target by receiving the signals originating from the vehicle being launched;

processing a post-destruct function that operates by gathering appropriate data throughout the time period from before destruction to when the debris are illuminated and received by the system;

processing a debris tracking computation function that computes a state vector for each debris piece; and processing a debris impact computation function that includes computing a projected impact point, and error ellipse.

21. The method of claim 20, wherein the step of processing a pre-launch calibration and check-out function further comprises the steps of:

optimizing transmitter constellation;

predicting short-range/long-range handover;

verifying illumination; and polling remote frequency reference signals.

22. The method of claim 20, wherein the step of processing a post-launch function further comprises the steps of:

verifying vehicle detection;

pointing a target antenna and validating the target antenna; and verifying short-range/long-range handover.

23. The method of claim 20 wherein the step of processing a post-destruct function further comprises the steps of:

pointing a target antenna;

verifying destruction;

detecting debris fragments; and associating Doppler tracks of the debris fragments.

* * * * *